United States Patent
Li et al.

(10) Patent No.: US 12,199,719 B2
(45) Date of Patent: Jan. 14, 2025

(54) METHODS FOR SENDING AND RECEIVING CHANNEL STATE INFORMATION, TERMINAL DEVICE AND NETWORK DEVICE

(71) Applicant: DATANG MOBILE COMMUNICATIONS EQUIPMENT CO., LTD., Beijing (CN)

(72) Inventors: Hui Li, Beijing (CN); Qiubin Gao, Beijing (CN); Runhua Chen, Beijing (CN); Zhengxuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 511 days.

(21) Appl. No.: 17/422,433

(22) PCT Filed: Dec. 24, 2019

(86) PCT No.: PCT/CN2019/128025
§ 371 (c)(1),
(2) Date: Jul. 12, 2021

(87) PCT Pub. No.: WO2020/143446
PCT Pub. Date: Jul. 16, 2020

(65) Prior Publication Data
US 2022/0123806 A1    Apr. 21, 2022

(30) Foreign Application Priority Data

Jan. 11, 2019 (CN) .......... 201910028794.5
Feb. 15, 2019 (CN) .......... 201910116370.4
Apr. 26, 2019 (CN) .......... 201910346490.3

(51) Int. Cl.
H04B 7/06    (2006.01)
(52) U.S. Cl.
CPC ......... H04B 7/0626 (2013.01); H04B 7/0663 (2013.01)

(58) Field of Classification Search
None
See application file for complete search history.

(56) References Cited

U.S. PATENT DOCUMENTS

2017/0302353 A1    10/2017 Rahman et al.
2019/0058560 A1*    2/2019 Chen .................... H04B 7/0417
(Continued)

FOREIGN PATENT DOCUMENTS

| CN | 108574521 A | 9/2018 |
| CN | 109150267 A | 1/2019 |

(Continued)

OTHER PUBLICATIONS

"Summary of CSI enhancement for MU-MIMO support" by Samsung (Year: 2018).*

(Continued)

*Primary Examiner* — Pamit Kaur
(74) *Attorney, Agent, or Firm* — Kilpatrick Townsend & Stockton LLP

(57) ABSTRACT

Disclosed in the present application are methods for sending and receiving channel state information (CSI), a terminal device and a network device, which are used to provide a CSI sending method or receiving method on the basis of a Rel-16 codebook structure. The method for sending CSI includes determining a compressed basis vector in a precoding matrix, the compressed basis vector belonging to a set of candidate basis vectors, and the compressed basis vector weighted by coefficients of the precoding matrix is used to construct frequency domain characteristics of the precoding matrix; and sending the CSI to a network device, and the CSI includes basis vector indication information, and the basis vector indication information is used to indicate the compressed basis vector.

14 Claims, 3 Drawing Sheets

(56) References Cited

U.S. PATENT DOCUMENTS

2021/0336677 A1* 10/2021 Gao .................... H04B 7/0456
2022/0039107 A1*  2/2022 Wei .................... H04B 7/0486

FOREIGN PATENT DOCUMENTS

| JP | 2022527944 | A  |  6/2022 |
|----|------------|----|---------|
| WO | 2017166219 | A1 | 10/2017 |
| WO | 2017166940 | A1 | 10/2017 |
| WO | 2018182256 | A1 | 10/2018 |
| WO | 2018228425 | A1 | 12/2018 |

OTHER PUBLICATIONS

Ericsson,"Summary of views on CSI reporting v4", 3GPP TSG-RAN WG1 Meeting #94bis, Chengdu, P.R. China, Oct. 6-12, 2018, total 35 pages, R1-1812015.

Huawei et al.,"Discussion on CSI enhancement", 3GPP TSG RAN WGI Meeting #95, Spokane, USA, Nov. 12-16, 2018, total 8 pages, R1-1812242.

Samsung,"Summary of CSI enhancement for MU-MIMO support", 3GPP TSG RAN WG1 Meeting #95, Spokane, USA, Nov. 12-15, 2018, total 9 pages, R1-1813002.

CATT,"Considerations on Type II CSI enhancement", 3GPP TSG RAN WG1 Meeting #95, Spokane, USA, Nov. 12-16, 2018, total 9 pages, R1-1813917.

Huawei et al.,"Design for Type II Feedback", 3GPP TSG RAN WG1 NR Ad Hoc Meeting, Spokane, USA, Jan. 16-20, 2017, total 8 pages, R1-1700415.

* cited by examiner

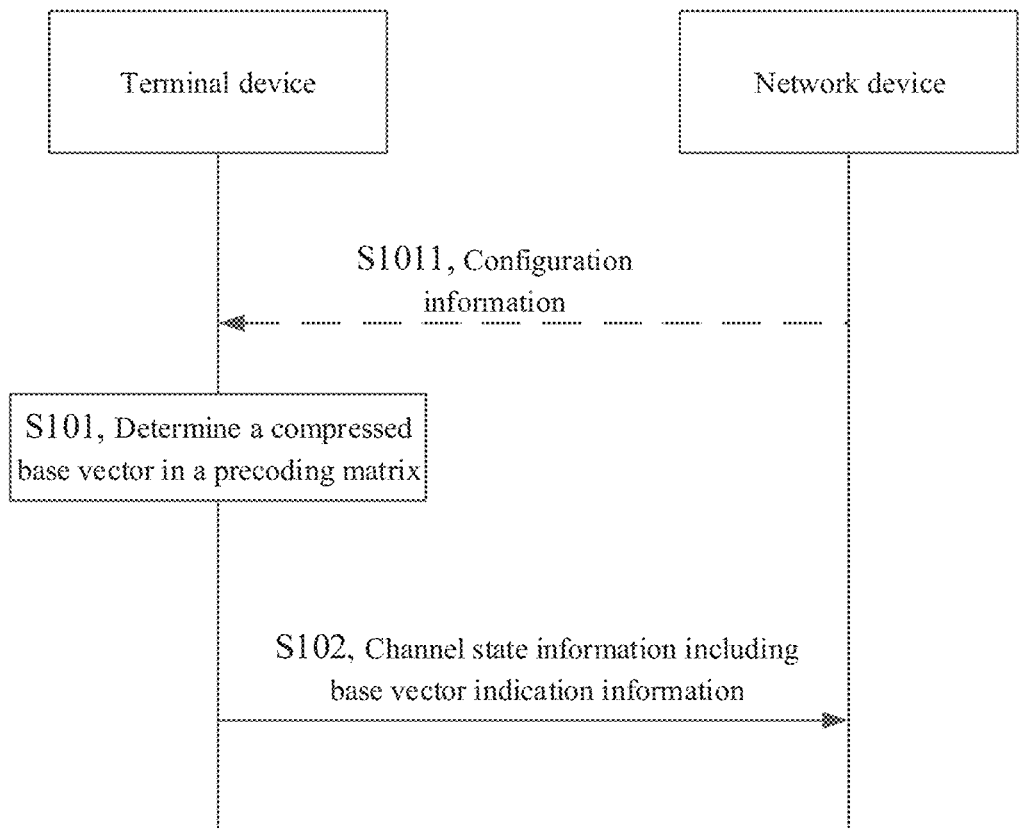

$$\tilde{\mathbf{W}}_{2,0} = \begin{bmatrix} p_{0,0}^{(0)} \cdot c_{0,0}^{(0)} & p_{0,1}^{(0)} \cdot c_{0,1}^{(0)} & \cdots & p_{0,M-1}^{(0)} \cdot c_{0,M-1}^{(0)} \\ p_{1,0}^{(0)} \cdot c_{1,0}^{(0)} & p_{1,1}^{(0)} \cdot c_{1,1}^{(0)} & \cdots & p_{1,M-1}^{(0)} \cdot c_{1,M-1}^{(0)} \\ \vdots & & & \vdots \\ p_{2L-1,0}^{(0)} \cdot c_{2L-1,0}^{(0)} & p_{2L-1,1}^{(0)} \cdot c_{2L-1,1}^{(0)} & \cdots & p_{2L-1,M-1}^{(0)} \cdot c_{2L-1,M-1}^{(0)} \end{bmatrix}$$

FIG. 4

$$\tilde{\mathbf{W}}_{2,0} = \begin{bmatrix} p_{0,0}^{(0)} \cdot c_{0,0}^{(0)} & p_{0,1}^{(0)} \cdot c_{0,1}^{(0)} & \cdots & p_{0,M-1}^{(0)} \cdot c_{0,M-1}^{(0)} \\ p_{1,0}^{(0)} \cdot c_{1,0}^{(0)} & p_{1,1}^{(0)} \cdot c_{1,1}^{(0)} & \cdots & p_{1,M-1}^{(0)} \cdot c_{1,M-1}^{(0)} \\ \vdots & & & \vdots \\ p_{2L-1,0}^{(0)} \cdot c_{2L-1,0}^{(0)} & p_{2L-1,1}^{(0)} \cdot c_{2L-1,1}^{(0)} & \cdots & p_{2L-1,M-1}^{(0)} \cdot c_{2L-1,M-1}^{(0)} \end{bmatrix}$$

FIG. 5

$$\tilde{\mathbf{W}}_{2,0} = \begin{bmatrix} p_{0,0}^{(0)} \cdot c_{0,0}^{(0)} & p_{0,1}^{(0)} \cdot c_{0,1}^{(0)} & \cdots & p_{0,M-1}^{(0)} \cdot c_{0,M-1}^{(0)} \\ p_{1,0}^{(0)} \cdot c_{1,0}^{(0)} & p_{1,1}^{(0)} \cdot c_{1,1}^{(0)} & \cdots & p_{1,M-1}^{(0)} \cdot c_{1,M-1}^{(0)} \\ \vdots & & & \vdots \\ p_{2L-1,0}^{(0)} \cdot c_{2L-1,0}^{(0)} & p_{2L-1,1}^{(0)} \cdot c_{2L-1,1}^{(0)} & \cdots & p_{2L-1,M-1}^{(0)} \cdot c_{2L-1,M-1}^{(0)} \end{bmatrix}$$

FIG. 6

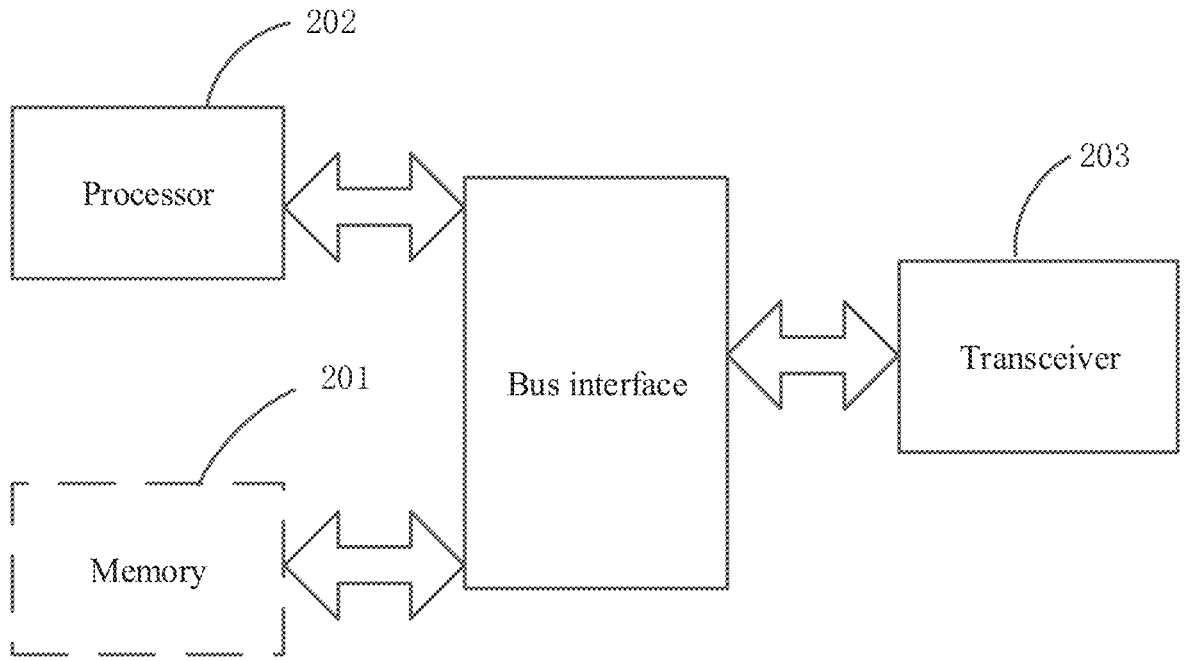

FIG. 7

METHODS FOR SENDING AND RECEIVING CHANNEL STATE INFORMATION, TERMINAL DEVICE AND NETWORK DEVICE

The present application is a National Stage of International Application No. PCT/CN2019/128025, filed on Dec. 24, 2019, which claims priority to Chinese patent application No. 201910028794.5 filed to the China National Intellectual Property Administration on Jan. 11, 2019, Chinese patent application No. 201910116370.4 filed to the China National Intellectual Property Administration on Feb. 15, 2019, and Chinese patent application No. 201910346490.3 filed to the China National Intellectual Property Administration on Apr. 26, 2019, all of which are incorporated herein by reference.

FIELD

The present application relates to the field of communication technology, in particular to methods for sending and receiving channel state information, a terminal device and a network device.

BACKGROUND

In a New Radio (NR) system, a Type II codebook is defined. The Type II codebook in Rel-15 is based on linear combining for orthogonal beams, and supports rank 1 and rank 2 codebooks. Since the quantity of coefficients in the codebook with Rank=2 is about twice the quantity of coefficients in the codebook with rank=1, when Rank Indication (RI) takes different values, the codebooks have a large difference in overhead, and therefore, the overhead is high when a terminal device feeds back Channel State Information (CSI) on the basis of the Type II codebook in Rel-15.

When a network device receives the CSI fed back by the terminal device, the value of RI cannot be known before correct decoding, so that the magnitude of overhead of the CSI cannot be determined. To avoid failure of correct decoding for CSI of the network device caused by overhead fuzziness, in Rel-15, for each sub-band, a two-part structure is adopted for reporting Type II CSI. The first part of the CSI has fixed overhead which is not related to the value of the RI, while the overhead of the second part of the CSI can be determined by a decoding result of the first part, so that the problem of overhead fuzziness is avoided. As feedback for each sub-band includes both a phase coefficient of the sub-band and an amplitude coefficient of the sub-band, when there are many sub-bands, feedback for coefficients of all sub-bands requires high feedback overhead. For this reason, a Type II codebook with low overhead is provided in Rel-16, and the Type II codebook with low overhead is based on a method of linear combining for orthogonal beams and of coefficient compression of sub-bands, that is, the coefficients of each sub-band are compressed, and the compressed coefficient is fed back to the network device to lower the overhead.

Currently, for the codebook structure in Rel-16, there is no corresponding sending or receiving mechanism for the CSI.

SUMMARY

Embodiments of the present application provide methods for sending and receiving channel state information, a terminal device and a network device, which are used to provide a CSI sending method or receiving method based on a codebook structure in Rel-16.

In a first aspect, a method for sending channel state information is provided, including:
  determining a compressed base vector in a precoding matrix, wherein the compressed base vector belongs to a set of candidate base vectors, and the compressed base vector weighted by coefficients of the precoding matrix is used to construct a frequency domain characteristic of the precoding matrix; and
  sending channel state information to a network device, wherein the channel state information includes base vector indication information, and the base vector indication information is used to indicate the compressed base vector.

In a second aspect, a method for receiving channel state information is provided, including:
  receiving channel state information from a terminal device, wherein the channel state information includes base vector indication information, the base vector indication information is used for indicating a compressed base vector in a precoding matrix, the compressed base vector belongs to a set of candidate base vectors, and the compressed base vector weighted by coefficients of the precoding matrix is used to construct a frequency domain characteristic of the precoding matrix; and
  parsing the channel state information according to the compressed base vector.

In a third aspect, a terminal device is provided, including: a memory, configured to store an instruction; a transceiver, used to send information under a control of the processor; and a processor, configured to read the instruction in the memory to:
  determine a compressed base vector in a precoding matrix, wherein the compressed base vector belongs to a set of candidate base vectors, and the compressed base vector weighted by coefficients of the precoding matrix is used to construct a frequency domain characteristic of the precoding matrix; and
  send channel state information to a network device, wherein the channel state information includes base vector indication information, and the base vector indication information is used to indicate the compressed base vector.

In a fourth aspect, a network device is provided, including: a memory, configured to store an instruction; a transceiver, used to send information under a control of the processor; and a processor, configured to read the instruction in the memory to:
  receive channel state information from a terminal device, wherein the channel state information includes base vector indication information, the base vector indication information is used for indicating a compressed base vector in a precoding matrix, the compressed base vector belongs to a set of candidate base vectors, and the compressed base vector weighted by coefficients of the precoding matrix is used to construct a frequency domain characteristic of the precoding matrix; and
  parse the channel state information according to the compressed base vector.

In a fifth aspect, a terminal device is provided, including: a determining unit, configured to determine a compressed base vector in a precoding matrix, wherein the compressed base vector belongs to a set of candidate base vectors, and the compressed base vector weighted by coefficients of the precoding matrix is used to construct a frequency domain characteristic of the precoding matrix; and a sending unit, configured to send channel state information to a network device, wherein the channel state information includes base vector indication information, and the base vector indication information is used to indicate the compressed base vector.

In a sixth aspect, a network device is provided, including: a receiving unit, configured to receive channel state information from a terminal device, wherein the channel state information includes base vector indication information, the base vector indication information is used for indicating a compressed base vector in a precoding matrix, the compressed base vector belongs to a set of candidate base vectors, and the compressed base vector weighted by coefficients of the precoding matrix is used to construct a frequency domain characteristic of the precoding matrix; and a parsing unit, configured to parse the channel state information according to the compressed base vector.

In a seventh aspect, a computer readable storage medium is provided, wherein the computer readable storage medium stores a computer instruction, and when the computer is run on a computer, the computer instruction causes the computer execute the methods according to any one of the above first aspect or the second aspect.

In the embodiments of the present application, the channel state information sent by the terminal device to the network device includes the base vector indication information to indicate the compressed base vector adopted by the terminal device to weight coefficients of the precoding matrix, so that the network device can determine the used precoding matrix on the basis of the compressed base vector, beams in the precoding matrix and the coefficients of the precoding matrix, so as to parse the received channel state information to determine a channel state reported by the terminal device.

BRIEF DESCRIPTION OF THE DRAWINGS

FIG. 1 is a schematic flowchart of a method for sending or receiving channel state information provided by an embodiment of the present application.

FIG. 2 is a preset coefficient matrix that is all the coefficients corresponding to the 2 L beams.

FIG. 3 is a formula in which a coefficient in a dashed box is a zero coefficient indicated by zero coefficient indication information.

FIG. 4 is a formula in which coefficients outside the dashed box are a non-zero coefficient range indicated by non-zero coefficient indication information.

FIG. 5 is a formula in which coefficients are included in dashed lines.

FIG. 6 is a formula in which a zero coefficient beam set is a zero coefficient beam set corresponding to a beam 1, and a zero coefficient base vector set is a zero coefficient base vector set corresponding to a base vector 1 and a base vector M−1.

FIG. 7 is a schematic structural diagram of a terminal device provided by an embodiment of the present application.

DETAILED DESCRIPTION OF THE EMBODIMENTS

Figure 8:
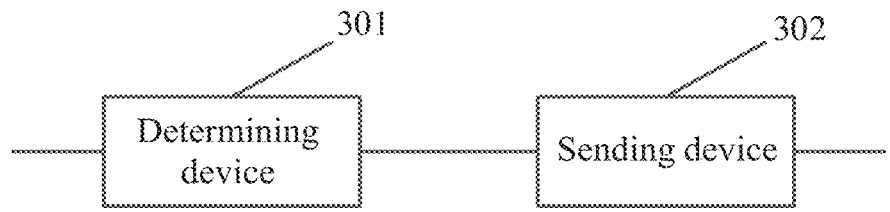
FIG. 8 is another schematic structural diagram of a terminal device provided by an embodiment of the present application.

In order to make the objectives, technical solutions and advantages of embodiments of the present application clearer, the technical solutions in the embodiments of the present application will be clearly and fully described below in combination with the accompanying drawings in the embodiments of the present application.

In the process of communication, a network device needs to collect CSI of all terminal devices to perform precoding and scheduling, so as to reduce interference between signals of the terminal devices as much as possible. The terminal devices can divide a whole system bandwidth into a plurality of sub-bands and feed CSI of all the sub-bands back to the network device. The network device generates a precoding matrix of the whole system bandwidth according to the CSI sent by the terminal devices, and uses the precoding matrix to map transmission layers to antenna ports. The transmission layers herein are referred to as precoding modules, and each transmission layer represents a data stream independently transmitted in a space domain or a beam domain. The transmission layers mapped by the precoding matrix of the whole system bandwidth include at least two transmission layers. Two transmission layers are taken as an example in the following description of the embodiments of the present application, and the two transmission layers are respectively a transmission layer I and a transmission layer II.

In the embodiments of the present application, on the basis of a codebook structure in Rel-16, a network device determines a precoding matrix of each transmission layer according to an orthogonal beam in the precoding matrix, a coefficient of the precoding matrix and a compressed base vector in the precoding matrix. The CSI sent by terminal devices to the network device may indicate the compressed base vector, so that the network device can determine the precoding matrix. The coefficient of the precoding matrix is a beam forming weighted value used by the precoding matrix to map each transmission layer.

The CSI sent by the terminal devices to the network device includes two parts, namely a first part of the CSI and a second part of the CSI respectively. As shown in Table 1, the first part of the CSI includes RI, a wideband Channel Quality Indication (CQI) corresponding to a first code word, differential CQI corresponding to the first code word, and a quantity of zero coefficients of the transmission layers mapped by the precoding matrix, such as a quantity of zero coefficients of the transmission layer I (a quantity of zero coefficients-1 in Table 1) and a quantity of zero coefficients of the transmission layer II (a quantity of zero coefficients-2 in Table 1). The zero coefficients in the embodiments of the present application refer to coefficients processed as 0.

TABLE 1

| RI | Wideband CQI-1 | Differential CQI-1 | Quantity of zero coefficients - 1 | Quantity of zero coefficients - 2 |
| --- | --- | --- | --- | --- |

As shown in Table 2, the second part of the CSI includes a twiddle factor, beam indication information, strongest beam indication-1 (strongest beam indication of the transmission layer I), a wideband amplitude coefficient-1 (the wideband amplitude coefficient of the transmission layer I), strongest beam indication-2 (strongest beam indication of the transmission layer II), a wideband amplitude coefficient-2 (the wideband amplitude coefficient of the transmission layer II), sub-band phases of even sub-bands, and sub-band phases of odd sub-bands. The sub-band phases of the even sub-bands may be replaced with a sub-band amplitude coefficient of the even sub-bands, or replaced with the sub-band phases of and the sub-band amplitude coefficient of the even sub-bands. The sub-band phases of the odd sub-bands may be replaced with a sub-band amplitude coefficient of the odd sub-bands, or replaced with the sub-band phases of and the sub-band amplitude coefficient of the odd sub-bands.

TABLE 2

| Twiddle factor | Beam indication | Strongest beam indication - 1 | Wideband amplitude coefficient - 1 | Strongest beam indication - 2 | Wideband amplitude coefficient - 2 | At least one of a sub-band amplitude and a phase of even sub-bands | At least one of a sub-band amplitude and a phase of odd sub-bands |
| --- | --- | --- | --- | --- | --- | --- | --- |

In the CSI shown in Table 1 and Table 2, the first part of the CSI has fixed overhead which is not related to a value of the RI, while the overhead of the second part of the CSI is determined by a decoding result of the first part. As the coefficient of each sub-band includes both the sub-band phase coefficient and the sub-band amplitude coefficient, when there are many sub-bands, sending of the coefficients of all the sub-bands by the terminal devices to the network device requires huge system overhead. Therefore, a Type II codebook with low overhead is defined in Rel-16 of an NR system. Taking a rank 1 codebook as an example, for all the sub-bands, a formula (1) of the rank 1 codebook is:

$$W = W_1 \tilde{W}_2 W_f^H = \begin{bmatrix} b_{k_1^{(0)}k_2^{(0)}} & b_{k_1^{(1)}k_2^{(1)}} & \cdots & b_{k_1^{(L-1)}k_2^{(L-1)}} & & & 0 & \\ & & 0 & & b_{k_1^{(0)}k_2^{(0)}} & b_{k_1^{(1)}k_2^{(1)}} & \cdots & b_{k_1^{(L-1)}k_2^{(L-1)}} \end{bmatrix} \cdot \begin{bmatrix} p_{0,0} \cdot c_{0,0} & p_{0,1} \cdot c_{0,1} & \cdots & p_{0,M-1} \cdot c_{0,M-1} \\ p_{1,0} \cdot c_{1,0} & p_{1,1} \cdot c_{1,1} & \cdots & p_{1,M-1} \cdot c_{1,M-1} \\ \vdots & & & \vdots \\ p_{2L-1,0} \cdot c_{2L-1,0} & p_{2L-1,1} \cdot c_{2L-1,1} & \cdots & p_{2L-1,M-1} \cdot c_{2L-1,M-1} \end{bmatrix} \cdot \begin{bmatrix} f_{0,0} & f_{0,1} & \cdots & f_{0,N-1} \\ f_{1,0} & f_{1,1} & \cdots & f_{1,N-1} \\ \vdots & & & \vdots \\ f_{M-1,0} & f_{M-1,1} & \cdots & f_{M-1,N-1} \end{bmatrix}. \quad (1)$$

In the formula (1), $W_1$ represents an orthogonal combining beam, and includes 2 L beams, $b_{k_1^{(L-1)}k_2^{(L-1)}}$ is the $L^{th}$ beam, $\tilde{W}_2$ represents a compressed coefficient of the sub-bands and is shared by all the sub-bands, $p_{i,j}$ represents the amplitude coefficient, $c_{i,j}$ represents a phase coefficient, $W_f^H$ is a conjugate matrix representing compressed base vectors ($W_f$) and includes M base vectors, the length of each vector is N, N is determined by the quantity of the sub-bands, and N may be the quantity of part of the sub-bands or the quantity of all the sub-bands. The terminal devices may compress the coefficient of each sub-band based on the Type II codebook defined in Rel-16, and send a compressed coefficient to the network device. However, currently, for the codebook structure in Rel-16, there is no corresponding sending or receiving mechanism for CSI.

In view of this, an embodiment of the present application provides a method for sending CSI. In the method, the channel state information sent by a terminal device to a network device includes base vector indication information used to indicate a compressed base vector adopted by the terminal device to weight coefficients of a precoding matrix, so that the network device can determine the precoding matrix used by all sub-bands into which a system bandwidth is divided on the basis of the compressed base vector, an orthogonal beam in the precoding matrix and the coefficients of the precoding matrix, so as to parse the received channel state information to determine a channel state reported by the terminal device.

The technical solution provided by the embodiment of the present application is introduced below in conjunction with the accompanying drawings.

Referring to FIG. 1, an embodiment of the present application provides a method for sending channel state information. Description of the flow of the method is as follows. Since the method for sending the channel state information relates to an interaction process between a network device and a terminal device, in the following description of the flow, processes executed by the network device and the terminal device are described together.

S101, the terminal device determines a compressed base vector in a precoding matrix.

In the embodiment of the present application, the terminal device may inform the network device of its compressed base vector for compressing coefficients of the precoding matrix, and the compressed base vector weighted by the coefficients of the precoding matrix is used to construct a frequency domain characteristic of the precoding matrix, so that the network device determines the precoding matrix for mapping each of two transmission layers on the basis of a codebook structure in Rel-16 and according to an orthogonal beam, the coefficients of the precoding matrix and the compressed base vector, so as to parse the received channel state information to determine a channel state reported by the terminal device.

Before the terminal device informs the network device of the compressed base vector, the compressed base vector used to weight the coefficients of the precoding matrix may be determined. The coefficients of the precoding matrix may be a beam forming weighted value used by the precoding matrix to map each transmission layer. The compressed base vector may be a base vector selected from a set of candidate base vectors, where the set of the candidate base vectors may be understood as a predefined set of base vectors. The set of the candidate base vectors may include a plurality of base vectors corresponding to each of all sub-bands into which a whole system is divided. The compressed base vector is composed of the base vectors selected from the set of the candidate base vectors corresponding to each sub-band, and is used to compress coefficients of each of all the sub-bands. For example, the compressed base vector may be represented as a following matrix:

$$\begin{bmatrix} f_{0,0}^{(1)} & f_{0,1}^{(1)} & \cdots & f_{0,N-1}^{(1)} \\ f_{1,0}^{(1)} & f_{1,1}^{(1)} & \cdots & f_{1,N-1}^{(1)} \\ \vdots & & & \vdots \\ f_{M-1,0}^{(1)} & f_{M-1,1}^{(1)} & \cdots & f_{M-1,N-1}^{(1)} \end{bmatrix}.$$

The matrix is exemplified by including M rows and N columns, where N may be the quantity of all the sub-bands, each column corresponds to a compressed base vector of each sub-band, and the compressed base vector includes M base vectors.

In a possible implementation, the terminal device may determine the compressed base vector according to configuration from the network device or a predefined rule. For example, the terminal device determines the compressed base vector according to configuration information from the network device, and the terminal device may also determine the compressed base vector according to preset zero coefficient information. Introduction is made below respectively.

The terminal device determines the compressed base vector according to the configuration information from the network device, and then before the terminal device sends the channel state information to the network device, the network device may execute the following step.

Step S1011, the network device may send the configuration information to the terminal device. The configuration information may be used to indicate at least one of: the quantity of compressed base vectors, the quantity of the sub-bands corresponding to the channel state information and the quantity of beams corresponding to each transmission layer mapped by the precoding matrix. The sub-bands corresponding to the channel state information may be understood as the sub-bands to be fed back by the terminal device. The terminal device determines the compressed base vector used by each sub-band according to the configuration information. In the embodiment of the present application, step S1011 is optional, so the step is illustrated by dashed lines in FIG. 1.

It is possible that the network device does not send the configuration information to the terminal device. In this case, the terminal device may determine the compressed base vector according to predefined configuration information. For example, a set of base vectors corresponding to each sub-band is predefined in advance, and a rule of selecting the compressed base vector from the set of the base vectors corresponding to each sub-band is predefined, so that the terminal device may determine the compressed base vector corresponding to the precoding matrix according to the predefined configuration information and the set of the base vectors corresponding to each sub-band.

Of course, in a possible implementation, the terminal device may also determine the compressed base vector in the precoding matrix according to the configuration information from the network device and the predefined configuration information. In this case, the configuration information may be set according to the predefined configuration information.

After the terminal device determines the compressed base vector in the precoding matrix, the terminal device notifies the compressed base vector to the network device. Specifically, continuing to refer to FIG. 1, step S102, the terminal device sends the channel state information to the network device.

The channel state information sent by the terminal device to the network device may include base vector indication information which is used to indicate compressed base vectors corresponding to the sub-bands respectively. In the embodiment of the present application, the base vector indication information may be implemented in the following two manners.

The first manner: the base vector indication information is a first bitmap, and one bit in the first bitmap corresponds to the position of one base vector of the compressed base vector in the set of the candidate base vectors.

For example, the set of the candidate base vectors includes N base vectors, and then the length of the first bitmap is N. Assuming that the compressed base vector of each sub-band includes M base vectors, then the base vector to be compressed may be preset to include N bits, values of M bits in the N bits are 1, values of the remaining N−M bits are 0, the M bits correspond to the positions of the base vectors, and then the base vectors corresponding to the M bits with the values 1 are selected from N base vectors, that is, the M base vectors form the compressed base vector of one sub-band, where N and M are both integers greater than or equal to 1.

To facilitate understanding, it is assumed that the set of the candidate base vectors of one sub-band includes 13 base vectors, and the base vector indication information is as shown in Table 3.

TABLE 3

| 1 | 1 | 1 | 0 | 0 | 1 | 0 | 0 | 0 | 1 | 1 | 0 | 1 |
|---|---|---|---|---|---|---|---|---|---|---|---|---|

A bit with the value of 1 indicates that the base vector is adopted, and a bit with the value of 0 indicates that the base vector is not used. Therefore, the compressed base vector includes base vectors {0, 1, 2, 5, 9, 10, 12}.

The second manner: the base vector indication information is an index combination of the base vectors included in the compressed base vector in the set of the candidate base vectors.

For example, the set of the candidate base vectors includes N base vectors, and then the length of the bitmap is N. Assuming that the compressed base vector of each sub-band includes M base vectors, indexes of M elements may be preset, such as {2, 3, 5 . . . }, where 2 represents the second base vector in the N base vectors, 3 represents the third base vector in the N base vectors, 5 represents the third base vector in the N base vectors, and so on.

To facilitate understanding, it is assumed that the set of the candidate base vectors of one sub-band includes 13 base vectors, the base vector indication information is an index set {2, 3, 5}, and then the compressed base vector of one sub-band includes base vectors {2, 3, 5}.

In the embodiment of the present application, the base vector indication information may be carried in the first part of the channel state information, or the second part of the channel state information, or both the first part and the second part of the channel state information.

The precoding matrix may use the same set of base vectors to map the two transmission layers, such as a first set of base vectors, or use different sets of base vectors, such as the first set of the base vectors for a transmission layer I and a second set of base vectors for a transmission layer II. The first set of the base vectors and the second set of the base vectors herein both come from the set of the candidate base vectors. Even if the precoding matrix uses the same set of base vectors to map the two transmission layers, a plurality of beams corresponding to the same transmission layer may use the same set of base vectors, such as a third set of base vectors, or use different sets of base vectors, such as the third set of the base vectors for the transmission layer I and a fourth set of the base vectors for the transmission layer II. The third set of the base vectors herein comes from the set of the base vectors used for the transmission layer I, and the fourth set of the base vectors herein comes from the set of the base vectors used for the transmission layer II.

According to the case that the precoding matrix uses the same or different sets of base vectors to map the two transmission layers and the case that the plurality of beams use the same or different sets of base vectors, the carrying ways of the base vector indication information in the channel state information may also be different. In a possible implementation, the carrying ways of the base vector indication information in the channel state information may include the following. The following is exemplified that the quantity of the sub-bands is N, the quantity of beams corresponding to each transmission layer is 2 L, and the compressed base vector includes M base vectors.

To facilitate understanding, it is assumed that a Type II codebook with Rank=2 is adopted, and then a precoding matrix of the transmission layer I may be represented as:

same set of base vectors, and the at least two transmission layers use the same compressed base vector.

The base vector indication information may be located in the first part of the channel state information, or the second part of the channel state information. For example, taking two transmission layers as an example, if the transmission layer I and the transmission layer II use the same compressed base vector, namely $W_{f,0}$ and $W_{f,1}$ are the same, at the moment, the base vector indication information may be located in the first part of the channel state information, namely Part one of the CSI, or, the base vector indication information may be located in the second part of the channel state information, namely Part two of the CSI.

Second case: 2 L beams corresponding to each of at least two transmission layers mapped by the precoding matrix use the same set of base vectors, and different transmission layers in the at least two transmission layers use different compressed base vectors.

The base vector indication information may be located in the first part of the channel state information, or the second part of the channel state information, or both the first part and the second part of the channel state information. If the base vector indication information is located in the first part of the channel state information in the first case, then in the second case, the base vector indication information is located in the second part of the channel state information, or located in the first part and the second part of the channel state information. If the base vector indication information is located in the second part of the channel state information in the first case, then in the second case, the base vector indication information is located in the first part of the channel state information, or located in the first part and the second part of the channel state information.

$$W^{(0)} = W_1 \tilde{W}_{2,0} W_{f,0}^H = \begin{bmatrix} b_{k_1^{(0)} k_2^{(0)}} & b_{k_1^{(1)} k_2^{(1)}} & \cdots & b_{k_1^{(L-1)} k_2^{(L-1)}} & 0 \\ 0 & & & & b_{k_1^{(0)} k_2^{(0)}} & b_{k_1^{(1)} k_2^{(1)}} & \cdots & b_{k_1^{(L-1)} k_2^{(L-1)}} \end{bmatrix}. \quad (2)$$

$$\begin{bmatrix} p_{0,0}^{(0)} \cdot c_{0,0}^{(0)} & p_{0,1}^{(0)} \cdot c_{0,1}^{(0)} & \cdots & p_{0,M-1}^{(0)} \cdot c_{0,M-1}^{(0)} \\ p_{1,0}^{(0)} \cdot c_{1,0}^{(0)} & p_{1,1}^{(0)} \cdot c_{1,1}^{(0)} & \cdots & p_{1,M-1}^{(0)} \cdot c_{1,M-1}^{(0)} \\ \vdots & & & \vdots \\ p_{2L-1,0}^{(0)} \cdot c_{2L-1,0}^{(0)} & p_{2L-1,1}^{(0)} \cdot c_{2L-1,1}^{(0)} & \cdots & p_{2L-1,M-1}^{(0)} \cdot c_{2L-1,M-1}^{(0)} \end{bmatrix} \cdot \begin{bmatrix} f_{0,0}^{(0)} & f_{0,1}^{(0)} & \cdots & f_{0,N-1}^{(0)} \\ f_{1,0}^{(0)} & f_{1,1}^{(0)} & \cdots & f_{1,N-1}^{(0)} \\ \vdots & & & \vdots \\ f_{M-1,0}^{(0)} & f_{M-1,1}^{(0)} & \cdots & f_{M-1,N-1}^{(0)} \end{bmatrix},$$

and a precoding matrix of the transmission layer II may be represented as:

Specifically, when the base vector indication information is located in the first part and the second part of the channel $$W^{(1)} = W_1 \tilde{W}_{2,1} W_{f,1}^H = \begin{bmatrix} b_{k_1^{(0)} k_2^{(0)}} & b_{k_1^{(1)} k_2^{(1)}} & \cdots & b_{k_1^{(L-1)} k_2^{(L-1)}} & 0 \\ 0 & & & & b_{k_1^{(0)} k_2^{(0)}} & b_{k_1^{(1)} k_2^{(1)}} & \cdots & b_{k_1^{(L-1)} k_2^{(L-1)}} \end{bmatrix}. \quad (3)$$

$$\begin{bmatrix} p_{0,0}^{(1)} \cdot c_{0,0}^{(1)} & p_{0,1}^{(1)} \cdot c_{0,1}^{(1)} & \cdots & p_{0,M-1}^{(1)} \cdot c_{0,M-1}^{(1)} \\ p_{1,0}^{(1)} \cdot c_{1,0}^{(1)} & p_{1,1}^{(1)} \cdot c_{1,1}^{(1)} & \cdots & p_{1,M-1}^{(1)} \cdot c_{1,M-1}^{(1)} \\ \vdots & & & \vdots \\ p_{2L-1,0}^{(1)} \cdot c_{2L-1,0}^{(1)} & p_{2L-1,1}^{(1)} \cdot c_{2L-1,1}^{(1)} & \cdots & p_{2L-1,M-1}^{(1)} \cdot c_{2L-1,M-1}^{(1)} \end{bmatrix} \cdot \begin{bmatrix} f_{0,0}^{(1)} & f_{0,1}^{(1)} & \cdots & f_{0,N-1}^{(1)} \\ f_{1,0}^{(1)} & f_{1,1}^{(1)} & \cdots & f_{1,N-1}^{(1)} \\ \vdots & & & \vdots \\ f_{M-1,0}^{(1)} & f_{M-1,1}^{(1)} & \cdots & f_{M-1,N-1}^{(1)} \end{bmatrix}.$$

In formulas (2) and (3), $W_1$ includes 2 L beams, and $W_{f,0}$ and $W_{f,1}$ are compressed base vectors which both include M base vectors. The quantity of the sub-bands corresponding to each transmission layer is 2 L*M.

First case: 2 L beams corresponding to each of at least two transmission layers mapped by the precoding matrix use the state information, the base vector indication information may include first sub indication information and second sub indication information, the first sub indication information is carried in the first part of the channel state information, and the second sub indication information is carried in the second part of the channel state information.

In a possible implementation, the first sub indication information is used to indicate a compressed base vector corresponding to part of the at least two transmission layers, and the second sub indication information is used to indicate a compressed base vector corresponding to remaining transmission layers other than the part of the at least two transmission layers.

For example, taking two transmission layers as an example, the first sub indication information may be used to indicate the compressed base vector used for the transmission layer I, and the second sub indication information may be used to indicate the compressed base vector used for the transmission layer II. Taking three transmission layers for another example, the first sub indication information may be used to indicate compressed base vectors used for two transmission layers, such as the transmission layer I and the transmission layer II, and the second sub indication information may be used to indicate a compressed base vector used for a transmission layer III, or, the first sub indication information may be used to indicate a compressed base vector used for one transmission layer, such as the transmission layer I, and the second sub indication information may be used to indicate compressed base vectors used for the transmission layer II and the transmission layer III.

In a possible implementation, the first sub indication information is used to indicate a set of base vectors used for at least two transmission layers, and the second sub indication information is used to indicate a set of base vectors used for each of the at least two transmission layers.

Taking two transmission layers as an example, the set of the base vectors used for the two transmission layers is also referred to as an absolute set of base vectors, representing a union set of a set of base vectors where the compressed base vector used for the transmission layer I is located and a set of base vectors where the compressed base vector used for the transmission layer II is located. The set of the base vectors used for each transmission layer is also referred to as a relative set of base vectors, the second sub indication information may be used to indicate a first relative set of base vectors and a second relative set of base vectors, the first relative set of the base vectors is the set of the base vectors where the compressed base vector used for the transmission layer I is located, and belongs to a subset of the absolute set of the base vectors, and the second relative set of the base vectors is the set of the base vectors where the compressed base vector used for the transmission layer II is located, and belongs to a subset of the absolute set of the base vectors. To facilitate understanding, the absolute set of the base vectors and the relative set of the base vectors are introduced below with specific examples.

It is assumed that the candidate base vectors include 13 base vectors, and a first part in the base vector indication information, namely the absolute set of the base vectors, indicates a length of 13 bits, as shown in Table 4.

TABLE 4

| 1 | 1 | 1 | 0 | 0 | 1 | 0 | 0 | 0 | 1 | 1 | 0 | 1 |
|---|---|---|---|---|---|---|---|---|---|---|---|---|

A bit with the value of 1 indicates that the base vector is adopted, and a bit with the value of 0 indicates that the base vector is not used. Therefore, the absolute set of the base vectors includes base vectors $\{0, 1, 2, 5, 9, 10, 12\}$.

The relative set of the base vectors of the transmission layer I indicated by the second sub indication information may be used to indicate an index set with the length being $M=4$, and the index set represents the positions of the base vectors of the relative set of the base vectors in the absolute set of the base vectors, such as $\{0, 1, 2, 3\}$, and represents base vectors $\{0, 1, 2, 5\}$ in the absolute set of the base vectors, where the base vectors form the first relative set of the base vectors. Similarly, the second relative set of the base vectors indicates an index set with the length being $M=4$, such as $\{1, 4, 5, 6\}$, and the index set represents base vectors $\{1, 9, 10, 12\}$ in the absolute set of the base vectors, where the base vectors form the second relative set of the base vectors.

In a possible implementation, the first sub indication information is used to indicate the quantity of base vectors in the set of the base vectors used for the at least two transmission layers, and the second sub indication information is used to indicate the set of the base vectors used for the at least two transmission layers as well as the set of the base vectors used for each of the at least two transmission layers.

For example, taking two transmission layers as an example, the first sub indication information may indicate the quantity of the base vectors included in the absolute set of the base vectors, and the second sub indication information may indicate the absolute set of the base vectors as well as the first relative set of the base vectors and the second relative set of the base vectors. For example, the first sub indication information indicates 6, the second sub indication information includes an index set $\{0, 2, 3, 5, 8, 9\}$ indicating the absolute set of the base vectors, and the index set represents base vectors 0, 2, 3, 5, 8, 9 in the set of the candidate base vectors, that is, the absolute set of the base vectors is $\{0, 2, 3, 5, 8, 9\}$. The first sub indication information further includes an index set $\{0, 1, 2, 3\}$ indicating the first relative set of the base vectors, the index set represents first 4 base vectors in the absolute set of the base vectors, namely base vectors $\{0, 2, 3, 5\}$, the first sub indication information further includes an index set $\{1, 2, 4, 5\}$ indicating the second relative set of the base vectors, and the index set represents 4 base vectors in the absolute set of the base vectors, namely base vectors $\{2, 3, 8, 9\}$.

In a possible implementation, the first sub indication information is used to indicate the quantity of the base vectors in the set of the base vectors used for the at least two transmission layers, and the second sub indication information is used to indicate the set of the base vectors used for each of the at least two transmission layers.

For example, taking two transmission layers as an example, the first sub indication information may indicate the quantity of the base vectors included in the absolute set of the base vectors, and the second sub indication information may indicate the first relative set of the base vectors and the second relative set of the base vectors. For example, the first sub indication information indicates 6, the second sub indication information further includes an index set $\{0, 1, 2, 3\}$ indicating the first relative set of the base vectors, and the index set represents first 4 base vectors in the absolute set of the base vectors. The first sub indication information further includes an index set $\{1, 2, 4, 5\}$ indicating the second relative set of the base vectors, and the index set represents 4 base vectors in the absolute set of the base vectors.

In a possible implementation, if the first sub indication information is used to indicate the quantity of the base vectors in the set of the base vectors used for the at least two transmission layers and the second sub indication information is used to indicate the set of the base vectors used for each of the at least two transmission layers, the base vectors in the set of the base vectors used for each of the at least two transmission layers are selected from the set of the candidate base vectors. The base vectors included in the set of the candidate base vectors are predefined by the system and determined according to the first sub indication information.

The set of the candidate base vectors herein may be understood as the above absolute set of the base vectors, only that the base vectors included in the set of the candidate base vectors may not be indicated by the second sub indication information, but is a set of base vectors predefined by the system. Meanwhile, the system determines the set of the candidate base vectors according to the first sub indication information.

In the embodiment of the present application, there may be the following implementations for implementing that the first sub indication information is used to indicate the quantity of the base vectors in the set of the base vectors used for the at least two transmission layers.

(1) The first sub indication information occupies $\lceil \log_2 (N_3) \rceil$ bits, where $N_3$ is the quantity of the base vectors included in the set of the candidate base vectors.

For example, it is assumed that 13 sub-bands exist in the system, that is, the quantity of the base vectors included in the set of the candidate base vectors is also 13, and the quantity is set to be $N_3$, namely $N_3=13$. The first sub indication information is carried in the first part of the CSI, and may occupy $\lceil \log_2 (13) \rceil = 4$ bits to indicate the quantity of the base vectors in the set of the base vectors used for the at least two transmission layers. To facilitate description below, the quantity of the base vectors in the set of the base vectors used for the at least two transmission layers is shown by $N_3'$.

Taking the first bit of the 4 bits being used as the highest digit and the last bit of the 4 bits being used as the lowest digit as an example, if the 4 bits are indicated as 0110, then $N_3'=6$.

In this case, the second sub indication information may indicate the set of the base vectors used for the at least two transmission layers in a bitmap mode. Meanwhile, the second sub indication information is also used to indicate the base vectors used for each transmission layer. For example, the second sub indication information includes two parts, one of the two parts is one bitmap, and one bit in the bitmap corresponds to the position of the set of the base vectors used for the at least two transmission layers in the set of the candidate base vectors. Specifically, reference may be made to the aforementioned indication manner for the absolute set of the base vectors, which is not repeated here. The other part is also one bitmap, and one bit in the bitmap corresponds to the positions of the base vectors used for each transmission layer in the set of the base vectors used for the at least two transmission layers. For example, the second sub indication information may be the bitmap as shown in Table 5.

TABLE 5

| 1 | 0 | 1 | 1 | 0 | 0 | 1 | 0 | 0 | 0 | 1 | 1 | 0 |
|---|---|---|---|---|---|---|---|---|---|---|---|---|

Or, the second sub indication information may occupy $$\left\lceil \log_2 \binom{N_3}{N_3'} \right\rceil$$

bits to indicate the set of the base vectors used for the at least two transmission layers. $N_3'$ is the quantity of the base vectors in the set of the base vectors used for the at least two transmission layers, and $N_3$ is the quantity of the base vectors in the set of the candidate base vectors.

For example, the second sub indication information occupies $$\left\lceil \log_2 \binom{N_3}{N_3'} \right\rceil = \left\lceil \log_2 \binom{13}{6} \right\rceil = 11$$

bits to indicate the set of the base vectors used for the at least two transmission layers.

(2) The first sub indication information occupies $\lceil \log_2 (M_{max}-M_{min}) \rceil$ bits, where $M_{max}$ is the sum of the quantity of the base vectors used for each of the at least two transmission layers, and $M_{min}$ is a maximum value in the quantity of the base vectors used for each of the at least two transmission layers.

For example, $M_{min}=\min\{M_{max}^i|i=0, 1, 2, 3)\}$, where $M_{max}^i$ represents a maximum value in the quantities $M_0$, $M_1, \ldots, M_i$ of the compressed base vectors configured by the system respectively for a transmission layer 0, a transmission layer 1, ... and a transmission layer i of the terminal device when RI is i. $M_{max}=\min\{\tilde{M}_{max}^i, N_3\}$ where $\tilde{M}_{max}^i=\max\{M_{sum}^i|i=0, 1, 2, 3\}$ represents a maximum value of the sum of the quantities $M_0$, $M_1, \ldots, M_i$ of the compressed base vectors configured by the system respectively for the transmission layer 0, the transmission layer 1, ... and the transmission layer i of the terminal device when RI is i.

It is assumed that 13 sub-bands exist in the system, a base station configures values of M of the quantities of the compressed base vectors of each transmission layer when values of RI are different according to Table 6 for the terminal device through high-level signaling.

TABLE 6

| RI | Transmission layer | M |
|---|---|---|
| 1 | 0 | M0 = M1 = 7 |
| 2 | 0 | |
|   | 1 | |
| 3 | 0 | M0 = M1 = 7 |
|   | 1 | |
|   | 2 | M2 = 4 |
| 4 | 0 | M0 = M1 = 7 |
|   | 1 | |
|   | 2 | M2 = M3 = 4 |
|   | 3 | |

It can be seen from Table 6 that a minimum value of $N_3'$ is $M_{min}=\min\{M_{max}^i|i=0, 1, 2, 3\}=7$, and a maximum value of $N_3'$ is $M_{max}=\min\{\tilde{M}_{max}^i, N_3\}=13$. In the embodiment of the present application, the first sub indication information may indicate the value of $N_3'$ through $\lceil \log_2 (M_{max}-M_{min}) \rceil = \lceil \log_2 (13-7) \rceil = 3$ bits. For example, taking the first bit of the three bits being used as the highest digit and the last bit of the three bits being used as the lowest digit as an example, if the three bits are indicated as 010, then $N_3'=7+2=9$. Compared with the implementation (1), the first sub indication information in the implementation (2) occupies 1 less bit, thereby saving the overhead of signaling.

Further, the second sub indication information is also used to indicate the base vectors used for each transmission layer.

In a possible implementation, the second sub indication information occupies $$\left\lceil \log_2 \binom{N_3'}{M_i} \right\rceil \text{ bits,}$$

where $M_i$ is the quantity of the base vectors used for each transmission layer.

For example, the second sub indication information occupies $$\left\lceil \log_2 \binom{N_3'}{M_i} \right\rceil = \left\lceil \log_2 \binom{9}{7} \right\rceil = 6$$

bits to indicate a set of base vectors used for the transmission layer 1. The second sub indication information occupies $$\left\lceil \log_2 \binom{N_3'}{M_i} \right\rceil = \left\lceil \log_2 \binom{9}{7} \right\rceil = 6$$

bits to indicate a set of base vectors used for the transmission layer 2. The second sub indication information occupies $$\left\lceil \log_2 \binom{N_3'}{M_i} \right\rceil = \left\lceil \log_2 \binom{9}{4} \right\rceil = 7$$

bits to indicate a set of base vectors used for the transmission layer 3.

In a possible implementation, the second sub indication information is one bitmap, and one bit in the bitmap corresponds to the positions of the base vectors used for each transmission layer in the set of the base vectors used for the at least two transmission layers.

For example, if RI=3, the second sub indication information indicates base vectors adopted by the transmission layer 1 and the transmission layer 2 respectively through the following three bitmaps. Indications of base vectors adopted by the transmission layer 0, the transmission layer 1 and the transmission layer 2 are as shown in Table 7, Table 8 and Table 9 respectively.

TABLE 7

| Transmission layer 0 | | | | | | | | |
|---|---|---|---|---|---|---|---|---|
| 1 | 1 | 0 | 1 | 1 | 1 | 1 | 0 | 1 |

TABLE 8

| Transmission layer 1 | | | | | | | | |
|---|---|---|---|---|---|---|---|---|
| 1 | 0 | 1 | 1 | 0 | 1 | 1 | 1 | 1 |

TABLE 9

| Transmission layer 2 | | | | | | | | |
|---|---|---|---|---|---|---|---|---|
| 1 | 0 | 0 | 0 | 1 | 1 | 0 | 0 | 1 |

For another example, the base station configures values of M of the quantities of the compressed base vectors of each transmission layer when values of RI are different according to Table 10 for the terminal device through high-level signaling.

TABLE 10

| RI | Transmission layer | M |
|---|---|---|
| 1 | 0 | M0 = M1 = 7 |
| 2 | 0 | |
|   | 1 | |
| 3 | 0 | M0 = M1 = 7 |
|   | 1 | |
|   | 2 | M2 = 4 |
| 4 | 0 | M0 = M1 = 7 |
|   | 1 | |
|   | 2 | M2 = M3 = 4 |
|   | 3 | |

A minimum value of $N_3'$ is $M_{min}=\min\{M_{max}^i | i=0, 1, 2, 3\}=2$, and a maximum value of $N_3'$ is $M_{max}=\min\{\hat{M}_{max}^i, N_3\}=8$, so that the first sub indication information may indicate the value of $N_3'$ through $\lceil \log_2 (M_{max}-M_{min}) \rceil = \lceil \log_2 (8-2) \rceil = 3$ bits. For example, taking the first bit of the three bits being used as the highest digit and the last bit of the three bits being used as the lowest digit as an example, if the three bits are indicated as 011, then $N_3'=2+3=5$.

Similarly, in this case, the second sub indication information may occupy $$\left\lceil \log_2 \binom{N_3'}{M_i} \right\rceil$$

bits to indicate the base vectors adopted by each transmission layer, which is not repeated here.

For another example, the base station configures values of M of the quantities of the compressed base vectors of each transmission layer when values of RI are different according to Table 11 for the terminal device through high-level signaling.

TABLE 11

| RI | Layer | M |
|---|---|---|
| 1 | 0 | $M_0 = 7$ |
| 2 | 0 | $M_0 = 7$ |
|   | 1 | $M_1 = 7$ |
| 3 | 0 | $M_0 = 7$ |
|   | 1 | $M_1 = 4$ |
|   | 2 | $M_2 = 3$ |
| 4 | 0 | $M_0 = 7$ |
|   | 1 | $M_1 = 3$ |
|   | 2 | $M_2 = 2$ |
|   | 3 | $M_3 = 2$ |

A minimum value of $N_3'$ is $M_{min}=\min\{M_{max}^i | i=0, 1, 2, 3\}=7$, and a maximum value of $N_3'$ is $M_{max}=\min\{\hat{M}_{max}^i, N\}=13$, so that the first sub indication information may indicate the value of $N_3'$ through $\lceil \log_2 (M_{max}-M_{min}) \rceil = \lceil \log_2 (13-7) \rceil = 3$ bits. For example, taking the first bit of the three bits being used as the highest digit and the last bit of the three bits being used as the lowest digit as an example, if the three bits are indicated as 011, then $N_3'=7+3=10$.

Similarly, in this case, the second sub indication information may occupy $$\left\lceil \log_2 \binom{N_3'}{M_i} \right\rceil$$

bits to indicate the base vectors adopted by each transmission layer, which is not repeated here.

(3) In the embodiment of the present application, if the system predefines or the network device configures that each of the at least two transmission layers uses $M_{def}$ quantity of base vectors, where $M_{def} \geq 1$, then the first sub indication information occupies $\lceil \log_2 (M_{max}-M_{min}-M_{def}) \rceil$ bits to indicate the quantity of the base vectors in the set of the base vectors used for the at least two transmission layers.

For example, it is assumed that 13 sub-bands exist in the system, that is, the quantity of the base vectors included in the set of the candidate base vectors is also 13, and the base station configures values of M of the quantities of the compressed base vectors of each transmission layer when values of RI are different according to Table 12 for the terminal device through high-level signaling.

TABLE 12

| RI | Layer | M |
|---|---|---|
| 1 | 0 | $M_0 = 7$ |
| 2 | 0 | $M_0 = 7$ |
|   | 1 | $M_1 = 7$ |
| 3 | 0 | $M_0 = 7$ |
|   | 1 | $M_1 = 4$ |
|   | 2 | $M_2 = 3$ |
| 4 | 0 | $M_0 = 7$ |
|   | 1 | $M_1 = 3$ |
|   | 2 | $M_2 = 2$ |
|   | 3 | $M_3 = 2$ |

It can be seen from Table 12 that a minimum value of $N_3'$ is $M_{min}=\min\{M_{max}^i|i=0, 1, 2, 3\}=7$, and a maximum value of $N_3'$ is $M_{max}=\min\{\tilde{M}_{max}^i, N_3\}=13$. If the system predefines or configures that each transmission layer adopts fixed $M_{def}=2$ compressed base vectors, such as the first and second compressed base vectors in candidate compressed base vectors, the first sub indication information may indicate the value of $N_3'$ through $\lceil \log_2 (M_{max}-M_{min}-M_{def}) \rceil = \lceil \log_2(13-7-2) \rceil = 2$ bits. For example, taking the first bit of the two bits being used as the highest digit and the last bit of the two bits being used as the lowest digit as an example, if the 2 bits are indicated as 11, then $N_3'=7+3+2=12$. Compared with the implementation (1), the first sub indication information in the implementation (3) occupies 2 less bits, thereby saving the overhead of signaling.

Similarly, in this case, the second sub indication information may occupy $$\left\lceil \log_2 \binom{N_3'}{M_i} \right\rceil$$

bits to indicate the base vectors adopted by each transmission layer, which is not repeated here.

In a possible implementation, if RI=1, when the second sub indication information occupies $$\left\lceil \log_2 \binom{N_3'}{M_i} \right\rceil$$

bits to indicate the base vectors adopted by each transmission layer, the terminal device may not report, or, the terminal device adopts one bit for indication.

For example, it is assumed that 13 sub-bands exist in the system, that is, the quantity of the base vectors included in the set of the candidate base vectors is also 13, and the base station configures values of M of the quantities of the compressed base vectors of each transmission layer when values of RI are different according to Table 13 for the terminal device through high-level signaling.

TABLE 13

| RI | Layer | M |
|---|---|---|
| 1 | 0 | $M_0 = 7$ |
| 2 | 0 | $M_0 = 7$ |
|   | 1 | $M_1 = 7$ |
| 3 | 0 | $M_0 = 7$ |
|   | 1 | $M_1 = 4$ |
|   | 2 | $M_2 = 3$ |
| 4 | 0 | $M_0 = 7$ |
|   | 1 | $M_1 = 3$ |
|   | 2 | $M_2 = 2$ |
|   | 3 | $M_3 = 2$ |

When RI=1, according to system predefinition, the terminal device may not report the base vectors adopted by each transmission layer in the second part of the CSI; or, the second sub indication information uses one bit value (e.g., 0) to indicate the base vectors adopted by the transmission layer 0; or, the second sub indication information uses one bitmap as shown in Table 14 for indication.

TABLE 14

| 1 | 1 | 1 | 1 | 1 | 1 | 1 |
|---|---|---|---|---|---|---|

Third case: different beams in at least one beam corresponding to each of the at least two transmission layers mapped by the precoding matrix use different sets of base vectors, and the base vector indication information may be located in the first part of the channel state information, or the second part of the channel state information, or both the first part and the second part of the channel state information. In this case, for each transmission layer, the terminal device may send 2 L compressed base vectors to the network device.

In a possible implementation, the quantities of base vectors in sets of base vectors corresponding to the different beams are the same or different, the base vector indication information is located in the first part or the second part of the channel state information, and the base vector indication information is a bitmap with the length being 2 L*N, where 2 L is the quantity of the beams, and N is the quantity of the set of the candidate base vectors. One preset bit corresponds to the position of the compressed base vector corresponding to one transmission layer in the set of the candidate base vectors.

In a possible implementation, the quantities of the base vectors in the sets of the base vectors corresponding to the different beams are the same or different, the base vector indication information includes the first sub indication information and the second sub indication information, the first sub indication information may be carried in the first part of the channel state information, and the second sub indication information may be carried in the second part of the channel state information. The first sub indication information may indicate the quantity K of the base vectors in the absolute set of the base vectors, and the second sub indication information is used to indicate K base vectors in the absolute set of the base vectors.

For example, for each transmission layer, the base vector indication information is the bitmap with the length being 2 L*K, where each bit corresponds to one base vector in the absolute set of the base vectors. For example: the quantity of the base vectors in the set of the candidate base vectors is N=13, the quantity of the beams is L=2, the first sub indication information is used to indicate the quantity K=5 of the base vectors in the absolute set of the base vectors, the second sub indication information indicates that the absolute set of the base vectors is {0, 2, 4, 5, 7}, and the second sub indication information adopts the bitmap as shown in Table 15 to indicate the first relative set of the base vectors.

TABLE 15

| 1 | 0 | 1 | 1 | 1 |
|---|---|---|---|---|
| 0 | 1 | 0 | 0 | 1 |
| 1 | 1 | 0 | 0 | 0 |
| 0 | 1 | 1 | 0 | 0 |

In Table 15, the first row represents a set of base vectors corresponding to a first beam of the transmission layer I, namely the first relative set of the base vectors. The bitmap of the first row is 10111, and the first relative set of the base vectors corresponding to the absolute set of the base vectors {0, 2, 4, 5, 7} is {0, 4, 5, 7}. Similarly, the second row represents that a relative set of base vectors corresponding to a second beam of the transmission layer I is {2, 7}, and so on.

Similarly, the second sub indication information adopts the bitmap as shown in Table 16 to indicate the second relative set of the base vectors.

TABLE 16

| 1 | 1 | 1 | 0 | 0 |
|---|---|---|---|---|
| 0 | 1 | 1 | 0 | 1 |
| 1 | 0 | 0 | 1 | 0 |
| 1 | 0 | 0 | 0 | 1 |

In Table 16, the first row represents a set of base vectors corresponding to a first beam of the transmission layer II, namely the first relative set of the base vectors. The bitmap of the first row is 11100, and the first relative set of the base vectors corresponding to the absolute set of the base vectors {0, 2, 4, 5, 7} is {0, 2, 4}. Similarly, the second row represents that the second relative set of the base vectors corresponding to a second beam of the transmission layer II is {2, 4, 7}, and so on.

In a possible implementation, the base vector indication information includes the first sub indication information and the second sub indication information, the first sub indication information may be carried in the first part of the channel state information, and the second sub indication information may be carried in the second part of the channel state information. The first sub indication information may indicate the quantities of the base vectors in the sets of the base vectors used for the at least two transmission layers respectively, and the second sub indication information is used to indicate a set of base vectors corresponding to each beam of each transmission layer.

For example, for each transmission layer, the second sub indication information includes one piece of base vector set indication information and one bitmap. For example, the quantity of the base vectors in the set of the candidate base vectors is N=13, the quantity of the beams is L=2, and the first sub indication information is used to indicate the quantity K1=5 of the base vectors in the set of the base vectors used for the transmission layer I and the quantity K2=3 of the base vectors in the set of the base vectors used for the transmission layer II. The second sub indication information is used to indicate that the set of the base vectors used for the transmission layer I is {0, 2, 4, 5, 7} and the set of the base vectors used for the transmission layer II is {3, 7, 10}. The second sub indication information includes the 2 L*K1 bitmaps as shown in Table 17 to indicate the set of the base vectors of the transmission layer I.

TABLE 17

| 1 | 0 | 1 | 1 | 1 |
|---|---|---|---|---|
| 0 | 1 | 0 | 0 | 1 |
| 1 | 1 | 0 | 0 | 0 |
| 0 | 1 | 1 | 0 | 0 |

In Table 17, the first row represents that a set of base vectors corresponding to the first beam of the transmission layer I is base vectors {0, 4, 5, 7}, and the second row represents that a set of base vectors corresponding to the second beam of the transmission layer I is base vectors {2, 7}, and so on.

The second sub indication information further includes 2 L*K1 bitmaps as shown in Table 18 to indicate the set of the base vectors of the transmission layer II.

TABLE 18

| 1 | 1 | 1 |
|---|---|---|
| 0 | 1 | 1 |
| 1 | 0 | 1 |
| 1 | 1 | 0 |

In Table 18, the first row represents that a set of base vectors corresponding to the first beam of the transmission layer II is base vectors {3, 7, 10}, and the second row represents that a set of base vectors corresponding to the second beam of the transmission layer II is base vectors {7, 10}, and so on.

In a possible implementation, the base vector indication information includes the first sub indication information and the second sub indication information, the first sub indication information may be carried in the first part of the channel state information, and the second sub indication information may be carried in the second part of the channel state information. The first sub indication information may be used to indicate the quantities of the sets of the base vectors respectively corresponding to each beam corresponding to each of the at least two transmission layers, and the second sub indication information is used to indicate a set of base vectors corresponding to each beam of each transmission layer.

For example: the quantity of the base vectors in the set of the candidate base vectors is N=13, and the quantity of the beams is L=2. The first sub indication information may indicate that the quantity of the base vectors in the set of the base vectors respectively corresponding to 2 L=4 beams of the transmission layer I is {2, 4, 3, 2} and the quantity of the base vectors in the set of the base vectors respectively corresponding to 2 L=4 beams of the transmission layer II is {2, 2, 2, 3}. The second sub indication information may indicate that the sets of the base vectors respectively corresponding to the 4 beams of the transmission layer I are {0, 1}, {1, 3, 4, 5}, {0, 5, 7} and {2, 8, 11}, and the sets of the base vectors respectively corresponding to the 4 beams of the transmission layer II are {2, 3}, {9, 10}, {8, 11} and {6, 9, 11}. Taking the second beam of the transmission layer II as an example, the first sub indication information indicates that the quantity of the base vectors in the set of the base vectors corresponding to this beam is 2, the second sub indication information indicates that the set of the base vectors corresponding to this beam is base vectors {9, 10} in the candidate base vectors, and so on for other beams.

In the embodiment of the present application, the terminal device may send the base vector indication information to the network device according to any of the first case to the third case so as to inform the network device to obtain the compressed base vector in the precoding matrix. The network device and the terminal device may appoint the obtained coefficients of the precoding matrix in advance, or, the system predefines the coefficients in the precoding matrix, for example, the predefined configuration information may also indicate the coefficients in the precoding matrix, at the moment, the terminal device may not send the coefficients in the precoding matrix to the network device, and it is defaulted that the network device knows the coefficients in the precoding matrix. For example, the network device and the terminal device appoint the coefficients in the precoding matrix in advance.

If the network device cannot obtain to-be-weighted coefficients of the precoding matrix, for example, the system does not predefine the coefficients of the precoding matrix, and the quantity of used coefficients is smaller than a first preset value, the first preset value may be, for example, a product of the quantity of at least one beam and the quantity of the base vectors in the compressed base vector. Taking 2 L beams and the compressed base vector including M base vectors as an example, when the first preset value is 2 L*M, that is, the quantity K0 of the used coefficients is smaller than 2 L*M, the network device possibly cannot obtain to-be-compressed coefficients in the precoding matrix.

In view of this, in the embodiment of the present application, the terminal device may also inform the network device of the coefficients in the precoding matrix, for example, the channel state information sent by the terminal device to the network device may also include zero coefficient indication information to indicate coefficients used as 0 in all the coefficients corresponding to all the sub-bands. For another example, the channel state information sent by the terminal device to the network device may also include non-zero coefficient indication information to indicate coefficients used as non-zero values in all the coefficients corresponding to all the sub-bands.

According to the case that the precoding matrix uses the same or different sets of base vectors to map the at least two transmission layers and the case that the plurality of beams use the same or different sets of base vectors, contents included in the zero coefficient indication information or the non-zero coefficient indication information may also be different, which will be specifically introduced below.

When 2 L beams of each of the two transmission layers mapped by the precoding matrix use the same set of base vectors, for each transmission layer, the terminal device may send K0<2 L*M base vectors to the network device to form the compressed base vector in the precoding matrix. In this case, coefficients and base vector indication information corresponding to each transmission layer both need to be sent to the network device. Sending the base vector indication information to the network device may be the same as the sending methods provided by the first case to the third case, and specifically see the sending methods provided by the first case to the third case, which will not be repeated here.

In a possible implementation, the coefficients of the precoding matrix may be a coefficient matrix including 2 L*M coefficients, and the zero coefficient indication information may be used to indicate the position of a zero coefficient in the coefficient matrix, so that a coefficient corresponding to the position in the coefficient matrix is the zero coefficient. Or, the non-zero coefficient indication information may be used to indicate the position of a non-zero coefficient in the coefficient matrix, so that a coefficient corresponding to the position in the coefficient matrix is the non-zero coefficient. The coefficient matrix may be predefined by the system, or sent by the terminal device to the network device. The zero-coefficient indication information or the non-zero coefficient indication information may be implemented through the following manners.

In a possible implementation, the zero coefficient indication information is used to indicate at least one of a row position and a column position of the zero coefficient in the coefficient matrix, for example, the zero coefficient indication information is an index of each of zero coefficients in the preset coefficient matrix, with the size being (2 L*M−K0)*log 2(2 L*M) bits. Further, the zero coefficient indication information may be a bitmap, and one preset bit in the bitmap is the column position of a corresponding zero coefficient in a row indicated by the index or the row position in a column. For example, the zero coefficient indication information is 2 L*M bits, and a bit with the value of 1 is used to indicate the position of the zero coefficient in the row indicated by the index or the position in the column, namely the precise position in the preset coefficient matrix.

In a possible implementation, the system may predefine a zero coefficient set for beams, and the zero coefficient set for the beams is referred to as a zero coefficient beam set to facilitate description. The system may also predefine a zero coefficient set for base vectors, and the zero coefficient set for the base vectors is referred to as a zero coefficient base vector set to facilitate description. The zero coefficient beam set corresponds to coefficients indicated by rows in the preset coefficient matrix, and the zero coefficient base vector set corresponds to coefficients indicated by columns in the preset coefficient matrix. For example, the preset coefficient matrix in FIG. 2 is all the coefficients corresponding to the 2 L beams.

The zero coefficient beam set is a coefficient set indicated by a row dashed line, and the zero coefficient base vector set is a coefficient set indicated by a column dashed line. Of course, the zero coefficient beam set and zero coefficient base vector set may also be sent by the terminal device to the network device, which is not limited in the embodiment of the present application.

Similarly, the system may predefine a non-zero coefficient set for beams, and the non-zero coefficient set for the beams is referred to as a non-zero coefficient beam set to facilitate description. The system may also predefine a non-zero coefficient set for base vectors, and the non-zero coefficient set for the base vectors is referred to as a non-zero coefficient base vector set to facilitate description. The non-zero coefficient beam set corresponds to coefficients indicated by rows in the preset coefficient matrix, and the non-zero coefficient base vector set corresponds to coefficients indicated by columns in the preset coefficient matrix. Similar to the zero coefficient beam set, taking the above zero coefficient beam set as an example, the non-zero coefficient beam set is a coefficient set other that indication of the row dashed line, and the non-zero coefficient base vector set is a coefficient set other than indication of the column dashed line. Of course, the non-zero coefficient beam set and non-zero coefficient base vector set may also be sent by the terminal device to the network device, which is not limited in the embodiment of the present application.

If the system predefines the zero coefficient beam set and the zero coefficient base vector set, the zero coefficient indication information may indicate the positions of the zero coefficients in the zero coefficient beam set and in the zero coefficient base vector set, namely the row positions and the column positions of the zero coefficients in the coefficient matrix. In a possible implementation, the zero coefficient indication information is indexes of the zero coefficients in the zero coefficient beam set and in the zero coefficient base vector set. For example, the zero coefficient indication information includes an index $\{1, M-1\}$ of a zero coefficient in the zero coefficient base vector set and an index $\{1\}$ of the zero coefficient in the zero coefficient beam set, and then the zero coefficient indicated by the zero coefficient indication information is a coefficient in a dashed box in the formula in FIG. 3.

In the dashed region, the positions of the zero coefficients are indicated, namely 4 L+M-2 positions. Of course, the zero coefficient indication information may also be a bitmap, namely including 4 L+M-2 bits, indicating that coefficients at corresponding positions in the dashed region are the zero coefficients.

Similarly, in a possible implementation, the non-zero coefficient indication information includes a second bitmap and a third bitmap. The second bitmap is used to indicate the non-zero coefficient beam set and the non-zero coefficient base vector set, and includes 2 L+M bits. M bits are used to indicate the non-zero coefficient base vector set, and bits corresponding to base vector indexes $\{0, 2, 3, \ldots, M-2\}$ are set to be 1. 2 L bits are used to indicate the non-zero coefficient beam set, and bits corresponding to beam indexes $\{0, 2, 3, \ldots, 2L-1\}$ are set to be 1. Therefore, a non-zero coefficient range indicated by the non-zero coefficient indication information is coefficients outside the dashed box in the formula in FIG. 4.

Further, the third bitmap is used to indicate at least one of: the column positions of the non-zero coefficients in a row and the row positions of the non-zero coefficients in a column indicated by the second bitmap. For example, the third bitmap uses 2 LM-(4 L+M-2) bits to indicate that coefficients at corresponding positions outside the dashed region are the non-zero coefficients.

In a possible implementation, part of row coefficients in a plurality of row coefficients in the coefficient matrix is predefined to use. For example, according to a strong-weak relation of the beams, the system predefines that the zero coefficient beam set is a zero coefficient beam set corresponding to the last L0 beams. The terminal device may not send this zero coefficient beam set to the network device. The zero coefficient indication information is used to indicate zero coefficients in the zero coefficient beam set corresponding to the L0 beams. For example, the zero coefficient indication information may be L0*M bitmaps, for example, it is assumed that the weakest L0=2 beams are a beam 1 and a beam 2 L-1, as the following formula. The zero coefficient indication information may include 2M bits to indicate the positions of the zero coefficients, namely the coefficients included in the dashed lines in the formula in FIG. 5.

In a possible implementation, the system predefines that coefficients at crossing positions of the zero coefficient beam set and the zero coefficient base vector set are the zero coefficients. To facilitate understanding, please see the formula in FIG. 6.

In the above formula, the zero coefficient beam set is a zero coefficient beam set corresponding to the beam 1, and the zero coefficient base vector set is a zero coefficient base vector set corresponding to a base vector 1 and a base vector M-1. The coefficients at the crossing positions of the zero coefficient beam set and the zero coefficient base vector set are $p_{1,1}^{(0)}$ and $p_{1,M-1}^{(0)}$, and $p_{1,1}^{(0)}$ and $p_{1,M-1}^{(0)}$ are the zero coefficients. At the moment, the zero coefficient indication information is used to indicate the zero coefficient beam set and the zero coefficient base vector set where the zero coefficients are located. Also in the above formula, the zero coefficient beam set and the zero coefficient base vector set is shown by the dashed lines.

In a possible implementation, the system predefines that coefficients at crossing positions of the zero coefficient beam set and the zero coefficient base vector set are the zero coefficients. At the same time, according to the strong-weak relation of the beams, the system predefines the zero coefficient beam set corresponding to the last L0 beams. At the moment, the terminal device may not send this zero coefficient beam set to the network device.

In a possible implementation, the system predefines that coefficients at crossing positions of the zero coefficient beam set and the zero coefficient base vector set are the zero coefficients. At the same time, according to a strong-weak relation of the base vectors, the system predefines the zero coefficient base vector set corresponding to the last S0 base vectors. At the moment, the terminal device may not send this zero coefficient base vector set to the network device.

In the embodiment of the present application, in step S102, the channel state information sent by the terminal device to the network device may further carry at least one wideband amplitude coefficient, and to facilitate description, the at least one wideband amplitude coefficient is referred to as a group of wideband amplitude coefficients below, and one wideband amplitude coefficient in the group of wideband amplitude coefficients corresponds to one compressed base vector in the codebook.

Continuing to refer to the codebook indicated by the formula (1), the coefficient matrix $\tilde{W}_2$ in the formula (1) may adopt various quantification manners, and in one possible quantification manner, $\tilde{W}_2$ may represent a quantification manner shown in a formula (4):

$$\tilde{W}_2 = \begin{bmatrix} p_{0,0} \cdot c_{0,0} & p_{0,1} \cdot c_{0,1} & \cdots & p_{0,M-1} \cdot c_{0,M-1} \\ p_{1,0} \cdot c_{1,0} & p_{1,1} \cdot c_{1,1} & \cdots & p_{1,M-1} \cdot c_{1,M-1} \\ \vdots & & & \vdots \\ p_{2L-1,0} \cdot c_{2L-1,0} & p_{2L-1,1} \cdot c_{2L-1,1} & \cdots & p_{2L-1,M-1} \cdot c_{2L-1,M-1} \end{bmatrix} \quad (4)$$

$$= \begin{bmatrix} p_{0,0}^{(2)} \cdot c_{0,0}^{(2)} & p_{0,1}^{(2)} \cdot c_{0,1}^{(2)} & \cdots & p_{0,M-1}^{(2)} \cdot c_{0,M-1}^{(2)} \\ p_{1,0}^{(2)} \cdot c_{1,0}^{(2)} & p_{1,1}^{(2)} \cdot c_{1,1}^{(2)} & \cdots & p_{1,M-1}^{(2)} \cdot c_{1,M-1}^{(2)} \\ \vdots & & & \vdots \\ p_{2L-1,0}^{(2)} \cdot c_{2L-1,0}^{(2)} & p_{2L-1,1}^{(2)} \cdot c_{2L-1,1}^{(2)} & \cdots & p_{2L-1,M-1}^{(2)} \cdot c_{2L-1,M-1}^{(2)} \end{bmatrix}.$$

$$\begin{bmatrix} p_0^{(1)} & 0 & \cdots & 0 \\ 0 & p_1^{(1)} & \ddots & \vdots \\ \vdots & \ddots & \ddots & 0 \\ 0 & \cdots & 0 & p_{M-1}^{(1)} \end{bmatrix}.$$

In the formula (4), a set constituted by diagonal elements in a matrix $$\begin{bmatrix} p_0^{(1)} & 0 & \cdots & 0 \\ 0 & p_1^{(1)} & \ddots & \vdots \\ \vdots & \ddots & \ddots & 0 \\ 0 & \cdots & 0 & p_{M-1}^{(1)} \end{bmatrix},$$

namely $p_0^{(1)}, p_1^{(1)} \ldots, p_{M-1}^{(1)}$ may be referred to as a set of wideband amplitude coefficients of the codebook, or may be used as a group of wideband amplitude coefficients, and one compressed base vector i (i=0, 1, ..., M−1) may also correspond to one group of phase coefficients, such as $\{c_{0,j}, c_{1,j} \ldots c_{M-1,j}\}$.

In a possible implementation, the channel state information sent by the terminal device to the network device may further carry at least one differential amplitude coefficient, and to facilitate description, the at least one differential amplitude coefficient is referred to as a group of differential amplitude coefficients below, and one differential amplitude coefficient in the group of differential amplitude coefficients corresponds to a differential coefficient of one wideband amplitude coefficient in the above group of wideband amplitude coefficients.

Continuing to refer to the formula (4), the group of differential amplitude coefficients herein may be $\{p_{0,0}^{(2)}, p_{1,0}^{(2)} \cdots p_{2L-1,0}^{(2)} \cdots p_{0,M-1}^{(2)} p_{1,M-1}^{(2)} \cdots p_{2L-1,M-1}^{(2)}\}$, and one differential amplitude coefficient $p_{2L-1,i}^{(2)}$ corresponds to a differential coefficient of one wideband amplitude coefficient $p_i^{(1)}$.

To sum up, in the embodiment of the present application, the channel state information sent by the terminal device to the network device includes the base vector indication information to indicate the compressed base vector adopted by the terminal device to compress the coefficients of the precoding matrix, so that the network device can determine the precoding matrix used by all the sub-bands on the basis of the compressed base vector, the orthogonal beams in the precoding matrix and the coefficients in the precoding matrix, so as to parse the received channel state information to determine the channel state reported by the terminal device.

The devices provided by the embodiment of the present application are introduced below in conjunction with the accompanying drawings of the specification.

Referring to FIG. 7, based on the same inventive concept, an embodiment of the present application further provides a terminal device. The terminal device includes a memory 201, a processor 202 and a transceiver 203. The memory 201 and the transceiver 203 may be connected with the processor 202 through a bus interface (FIG. 7 takes this as an example), or may also be connected with the processor 202 through a special connecting line. The transceiver 203 is used to send information under a control of the processor 202. The memory 201 may be configured to store programs.

The processor 202 may be used to read the programs in the memory 201, so as to execute the following process.

A compressed base vector in a precoding matrix is determined, wherein the compressed base vector belongs to a set of candidate base vectors, and the compressed base vector weighted by coefficients of the precoding matrix is used to construct a frequency domain characteristic of the precoding matrix.

Channel state information is sent to a network device, wherein the channel state information includes base vector indication information, and the base vector indication information is used to indicate the compressed base vector.

Optionally, the processor 202 is further configured to: determine the compressed base vector in the precoding matrix according to configuration information from the network device or which is predefined. The configuration information is used to indicate at least one of: a quantity of compressed base vectors, a quantity of sub-bands corresponding to the channel state information, or a quantity of beams respectively corresponding to each transmission layer mapped by the precoding matrix.

Optionally, the base vector indication information is a first bitmap, and one bit in the first bitmap corresponds to the position of one base vector of the compressed base vector in the set of the candidate base vectors; or, the base vector indication information is indexes of each base vector included in the compressed base vector in the set of the candidate base vectors.

Optionally, the base vector indication information is located in at least one of a first part or a second part of the channel state information.

Optionally, if at least one beam corresponding to each of at least two transmission layers mapped by the precoding matrix uses a same set of base vectors and the at least two transmission layers use a same compressed base vector, the base vector indication information is located in the first part of the channel state information; or, if at least one beam corresponding to each of the at least two transmission layers mapped by the precoding matrix uses a same set of base vectors and different transmission layers in the at least two transmission layers use different compressed base vectors, the base vector indication information is located in the second part of the channel state information, or, the base vector indication information is located in both the first part and the second part of the channel state information; and if different beams in the at least one beam corresponding to each of the at least two transmission layers mapped by the precoding matrix use different sets of base vectors, the base vector indication information is located in at least one of the first part or the second part of the channel state information.

Optionally, if the at least one beam corresponding to each of the at least two transmission layers mapped by the precoding matrix uses the same set of base vectors and different transmission layers in the at least two transmission layers use different compressed base vectors, the base vector indication information includes first sub indication information and second sub indication information, where the first sub indication information is carried in the first part, and the second sub indication information is carried in the second part, wherein:

the first sub indication information is used to indicate a compressed base vector corresponding to part of the at least two transmission layers, and the second sub indication information is used to indicate a compressed base vector corresponding to remaining transmission layers other than the part of the at least two transmission layers; or, the first sub indication information is used to indicate a set of base vectors used for the at least two transmission layers, and the second sub indication information is used to indicate a set of base vectors used for each of the at least two transmission layers; or, the first sub indication information is used to indicate a quantity of base vectors in the set of the base vectors used for the at least two transmission layers, and the second sub indication information is used to indicate the set of the base vectors used for the at least two transmission layers as well as the set of the base vectors used for each of the at least two transmission layers; or, the first sub indication information is used to indicate a quantity of the base vectors in the set of the base vectors used for the at least two transmission layers, and the second sub indication information is used to indicate the set of the base vectors used for each of the at least two transmission layers.

Optionally, if the first sub indication information is used to indicate the quantity of the base vectors in the set of the base vectors used for the at least two transmission layers and the second sub indication information is used to indicate the set of the base vectors used for each of the at least two transmission layers, the base vectors in the set of the base vectors used for each of the at least two transmission layers are selected from the set of the candidate base vectors, and base vectors included in the set of the candidate base vectors are predefined by a system and determined according to the first sub indication information.

Optionally, if the first sub indication information is used to indicate the quantity of the base vectors in the set of the base vectors used for the at least two transmission layers, then: the first sub indication information occupies $\lceil \log_2 (N_3) \rceil$ bits, where $N_3$ is the quantity of the base vectors in the set of the candidate base vectors; or, the first sub indication information occupies $\lceil \log_2 (M_{max}-M_{min}) \rceil$ bits, where $M_{max}$ is a sum of the quantity of the base vectors used for each of the at least two transmission layers, and $M_{min}$ is a maximum value in the quantity of the base vectors used for each of the at least two transmission layers.

Optionally, if the system predefines or the network device configures that each of the at least two transmission layers uses $M_{def}$ quantity of base vectors, where $M_{def} \geq 1$, then the first sub indication information occupies $\lceil \log_2 (M_{max}-M_{min}-M_{def}) \rceil$ bits.

Optionally, the second sub indication information includes a third part and a fourth part. The third part is used to indicate the set of the base vectors used for the at least two transmission layers, the third part is a bitmap or occupies $$\left\lceil \log_2 \binom{N_3}{N_3'} \right\rceil \text{ bits,}$$

one bit in the bitmap corresponds to the position of the set of the base vectors used for the at least two transmission layers in the set of the candidate base vectors, and $N_3'$ is a quantity of the base vectors in the set of the base vectors used for the at least two transmission layers. The fourth part is used to indicate base vectors used for each transmission layer. The second sub indication information is further another bitmap, or the fourth part occupies $$\left\lceil \log_2 \binom{N_3'}{M_i} \right\rceil \text{ bits,}$$

and one bit in the another bitmap corresponds to the positions of the base vectors used for each transmission layer in the set of the base vectors used for the at least two transmission layers, where $M_i$ is a quantity of the base vectors used for each transmission layer.

Optionally, if the fourth part occupies $$\left\lceil \log_2 \binom{N_3'}{M_i} \right\rceil$$

bits to indicate the base vectors used for each transmission layer and there is one transmission layer, the fourth part adopts one bit to indicate the base vectors used for each transmission layer, or the system predefines that the terminal device does not report the base vectors used for each transmission layer.

Optionally, if the different beams in the at least one beam corresponding to each of the at least two transmission layers mapped by the precoding matrix use the different sets of the base vectors, the base vector indication information is located in the first part or the second part of the channel state information, and the base vector indication information is a bitmap with the length being 2 L*N, where 2 L is the quantity of the beams, and N is a quantity of the set of the candidate base vectors. One preset bit corresponds to the position of the compressed base vector corresponding to one transmission layer in the set of the candidate base vectors.

Optionally, if the different beams in the at least one beam corresponding to each of the at least two transmission layers mapped by the precoding matrix use the different sets of the base vectors, the base vector indication information includes the first sub indication information and the second sub indication information, where the first sub indication information is carried in the first part, and the second sub indication information is carried in the second part. The first sub indication information is used to indicate a quantity K of the base vectors in the set of the base vectors used for the at least two transmission layers, and the second sub indication information is used to indicate K base vectors of each of the at least two transmission layers respectively in the set of the base vectors used for the at least two transmission layers; or, the first sub indication information is used to indicate quantities of the sets of the base vectors respectively used for the at least two transmission layers, and the second sub indication information is used to indicate the set of the base vectors corresponding to each beam of each of the at least two transmission layers; or, the first sub indication information is used to indicate a quantity of the base vectors in the set of the base vectors corresponding to each beam corresponding to each of the at least two transmission layers, and the second sub indication information is used to indicate the set of the base vectors corresponding to each beam of each of the at least two transmission layers.

Optionally, the processor 202 is used to determine the compressed base vector according to the configuration information from the network device, and if the at least one beam corresponding to each of the at least two transmission layers mapped by the precoding matrix uses the same set of the base vectors and a quantity of coefficients used by each transmission layer is smaller than a first preset value, the channel state information further carries zero coefficient indication information or non-zero coefficient indication information. The zero coefficient indication information is used to indicate zero coefficients used by each of the at least two transmission layers, and the zero coefficients are coefficients used as 0 in a plurality of coefficients of the precoding matrix. The non-zero coefficient indication information is used to indicate non-zero coefficients used by each of the at least two transmission layers, and the non-zero coefficients are coefficients used as non-zero values in the plurality of coefficients of the precoding matrix.

Optionally, the first preset value is a product of the quantity of the at least one beam and the quantity of the base vectors in the compressed base vector.

Optionally, the plurality of coefficients are a preset coefficient matrix, the zero coefficient indication information is used to indicate the positions of the zero coefficients in the coefficient matrix, or, the non-zero coefficient indication information is used to indicate the positions of the non-zero coefficients in the coefficient matrix.

Optionally, the zero coefficient indication information includes indexes of the zero coefficients in the coefficient matrix, and the indexes are used to indicate row positions or column positions of the zero coefficients in the coefficient matrix; or, the non-zero coefficient indication information includes a second bitmap and a third bitmap. The second bitmap is used to indicate row positions or column positions of all the non-zero coefficients in the coefficient matrix, and the third bitmap is used to indicate a column position of each of the non-zero coefficients in the row positions or a row position of each of the non-zero coefficients in the column positions indicated by the second bitmap indicated by the second bitmap.

Optionally, the zero coefficient indication information further includes a fourth bitmap, and one bit in the fourth bitmap corresponds to at least one of a column position in a row indicated by the index of one zero coefficient and a row position in a column indicated by the index of one zero coefficient.

Optionally, coefficients at crossing positions of column coefficients and row coefficients in the coefficient matrix are the zero coefficients, and the zero coefficient indication information is used to indicate the row coefficients and the column coefficients where the zero coefficients are located.

Optionally, it is predefined that the precoding matrix uses part of row coefficients in a plurality of row coefficients in the coefficient matrix, and the zero coefficient indication information is used to indicate zero coefficients of the part of row coefficients in the coefficient matrix.

Optionally, the channel state information further carries at least one wideband amplitude coefficient. One wideband amplitude coefficient corresponds to one compressed base vector in a codebook.

Optionally, the channel state information further carries at least one differential amplitude coefficient. One differential amplitude coefficient corresponds to a differential coefficient of one wideband amplitude coefficient.

In FIG. 7, a bus architecture may include interconnected buses of any quantity and bridges of any quantity, which are specifically linked together through various circuits of one or more processors represented by the processor 202 and various circuits of memories represented by the memory 201. The bus architecture may also link various other circuits such as peripheral devices, voltage regulators, and power management circuits, which are well known in the art, and therefore are not further described herein. A bus interface provides an interface. The transceiver 203 may be a plurality of elements, namely including a sender and a transceiver, and provides units for communication with various other apparatuses on a transmission medium. The processor 202 is responsible for managing the bus architecture and general processing, and the memory 201 may store data used when the processor 202 executes operations.

Referring to FIG. 8, based on the same inventive concept, an embodiment of the present application provides a terminal device. The terminal device includes a determining unit 301 and a sending unit 302. The determining unit is used to determine a compressed base vector in a precoding matrix, wherein the compressed base vector belongs to a set of candidate base vectors, and the compressed base vector weighted by coefficients of the precoding matrix is used to construct a frequency domain characteristic of the precoding matrix; and the sending unit is used to send channel state information to a network device, wherein the channel state information includes base vector indication information, and the base vector indication information is used to indicate the compressed base vector.

Optionally, the determining unit 301 is further configured to: determine the compressed base vector in the precoding matrix according to configuration information from the network device or which is predefined. The configuration information is used to indicate at least one of: a quantity of compressed base vectors, a quantity of sub-bands corresponding to the channel state information, or a quantity of beams respectively corresponding to each transmission layer mapped by the precoding matrix.

Optionally, the base vector indication information is a first bitmap, and one bit in the first bitmap corresponds to the position of one base vector of the compressed base vector in the set of the candidate base vectors; or, the base vector indication information is indexes of each base vector included in the compressed base vector in the set of the candidate base vectors.

Optionally, the base vector indication information is located in at least one of a first part or a second part of the channel state information.

Optionally, if at least one beam corresponding to each of at least two transmission layers mapped by the precoding matrix uses a same set of base vectors and the at least two transmission layers use a same compressed base vector, the base vector indication information is located in the first part of the channel state information; or, if at least one beam corresponding to each of the at least two transmission layers mapped by the precoding matrix uses a same set of base vectors and different transmission layers in the at least two transmission layers use different compressed base vectors, the base vector indication information is located in the second part of the channel state information, or, the base vector indication information is located in both the first part and the second part of the channel state information; and if different beams in the at least one beam corresponding to each of the at least two transmission layers mapped by the precoding matrix use different sets of base vectors, the base vector indication information is located in at least one of the first part or the second part of the channel state information.

Optionally, if the at least one beam corresponding to each of the at least two transmission layers mapped by the precoding matrix uses the same set of base vectors and different transmission layers in the at least two transmission layers use different compressed base vectors, the base vector indication information includes first sub indication information and second sub indication information, where the first sub indication information is carried in the first part, and the second sub indication information is carried in the second part, wherein: the first sub indication information is used to indicate a compressed base vector corresponding to part of the at least two transmission layers, and the second sub indication information is used to indicate a compressed base vector corresponding to remaining transmission layers other than the part of the at least two transmission layers; or, the first sub indication information is used to indicate a set of base vectors used for the at least two transmission layers, and the second sub indication information is used to indicate a set of base vectors used for each of the at least two transmission layers; or, the first sub indication information is used to indicate the quantity of base vectors in the set of the base vectors used for the at least two transmission layers, and the second sub indication information is used to indicate the set of the base vectors used for the at least two transmission layers as well as the set of the base vectors used for each of the at least two transmission layers; or, the first sub indication information is used to indicate the quantity of the base vectors in the set of the base vectors used for the at least two transmission layers, and the second sub indication information is used to indicate the set of the base vectors used for each of the at least two transmission layers.

Optionally, if the first sub indication information is used to indicate the quantity of the base vectors in the set of the base vectors used for the at least two transmission layers and the second sub indication information is used to indicate the set of the base vectors used for each of the at least two transmission layers, the base vectors in the set of the base vectors used for each of the at least two transmission layers are selected from the set of the candidate base vectors, and base vectors included in the set of the candidate base vectors are predefined by a system and determined according to the first sub indication information.

Optionally, if the first sub indication information is used to indicate the quantity of the base vectors in the set of the base vectors used for the at least two transmission layers, then: the first sub indication information occupies $\lceil \log_2 (N_3) \rceil$ bits, where $N_3$ is the quantity of the base vectors in the set of the candidate base vectors; or, the first sub indication information occupies $\lceil \log_2 (M_{max}-M_{min}) \rceil$ bits, where $M_{max}$ is a sum of the quantity of the base vectors used for each of the at least two transmission layers, and $M_{min}$ n is a maximum value in the quantity of the base vectors used for each of the at least two transmission layers.

Optionally, if the system predefines or the network device configures that each of the at least two transmission layers uses $M_{def}$ quantity of base vectors, where $M_{def} \geq 1$, then the first sub indication information occupies $\lceil \log_2 (M_{max}-M_{min}-M_{def}) \rceil$ bits.

Optionally, the second sub indication information includes a third part and a fourth part. The third part is used to indicate the set of the base vectors used for the at least two transmission layers, the third part is a bitmap or occupies $$\left\lceil \log_2 \binom{N_3}{N_3'} \right\rceil \text{ bits,}$$

one bit in the bitmap corresponds to the position of the set of the base vectors used for the at least two transmission layers in the set of the candidate base vectors, and $N_3'$ is the quantity of the base vectors in the set of the base vectors used for the at least two transmission layers. The fourth part is used to indicate base vectors used for each transmission layer. The second sub indication information is further another bitmap, or the fourth part occupies $$\left\lceil \log_2 \binom{N_3'}{M_i} \right\rceil \text{ bits,}$$

and one bit in the another bitmap corresponds to the positions of the base vectors used for each transmission layer in the set of the base vectors used for the at least two transmission layers, where $M_i$ is the quantity of the base vectors used for each transmission layer.

Optionally, if the fourth part occupies $$\left\lceil \log_2 \binom{N_3'}{M_i} \right\rceil$$

bits to indicate the base vectors used for each transmission layer and there is one transmission layer, the fourth part adopts one bit to indicate the base vectors used for each transmission layer, or the system predefines that the terminal device does not report the base vectors used for each transmission layer.

Optionally, if the different beams in the at least one beam corresponding to each of the at least two transmission layers mapped by the precoding matrix use the different sets of the base vectors, the base vector indication information is located in the first part or the second part of the channel state information, and the base vector indication information is a bitmap with the length being 2 L*N, where 2 L is the quantity of the beams, and N is the quantity of the set of the candidate base vectors. One preset bit corresponds to the position of the compressed base vector corresponding to one transmission layer in the set of the candidate base vectors.

Optionally, if the different beams in the at least one beam corresponding to each of the at least two transmission layers mapped by the precoding matrix use the different sets of the base vectors, the base vector indication information includes the first sub indication information and the second sub indication information, where the first sub indication information is carried in the first part, and the second sub indication information is carried in the second part. The first sub indication information is used to indicate the quantity K of the base vectors in the set of the base vectors used for the at least two transmission layers, and the second sub indication information is used to indicate K base vectors of each of the at least two transmission layers respectively in the set of the base vectors used for the at least two transmission layers; or, the first sub indication information is used to indicate the quantities of the sets of the base vectors respectively used for the at least two transmission layers, and the second sub indication information is used to indicate the set of the base vectors corresponding to each beam of each of the at least two transmission layers; or, the first sub indication information is used to indicate the quantity of the base vectors in the set of the base vectors corresponding to each beam corresponding to each of the at least two transmission layers, and the second sub indication information is used to indicate the set of the base vectors corresponding to each beam of each of the at least two transmission layers.

Optionally, the determining unit 301 is further configured to determine the compressed base vector according to the configuration information from the network device, and if the at least one beam corresponding to each of the at least two transmission layers mapped by the precoding matrix uses the same set of the base vectors and the quantity of coefficients used by each transmission layer is smaller than a first preset value, the channel state information further carries zero coefficient indication information or non-zero coefficient indication information. The zero coefficient indication information is used to indicate zero coefficients used by each of the at least two transmission layers, and the zero coefficients are coefficients used as 0 in a plurality of coefficients of the precoding matrix. The non-zero coefficient indication information is used to indicate non-zero coefficients used by each of the at least two transmission layers, and the non-zero coefficients are coefficients used as non-zero values in the plurality of coefficients of the precoding matrix.

Optionally, the first preset value is a product of the quantity of the at least one beam and the quantity of the base vectors in the compressed base vector.

Optionally, the plurality of coefficients are a preset coefficient matrix, the zero coefficient indication information is used to indicate the positions of the zero coefficients in the coefficient matrix, or, the non-zero coefficient indication information is used to indicate the positions of the non-zero coefficients in the coefficient matrix.

Optionally, the zero coefficient indication information includes indexes of the zero coefficients in the coefficient matrix, and the indexes are used to indicate row positions or column positions of the zero coefficients in the coefficient matrix; or, the non-zero coefficient indication information includes a second bitmap and a third bitmap. The second bitmap is used to indicate row positions or column positions of all the non-zero coefficients in the coefficient matrix, and the third bitmap is used to indicate a column position of each of the non-zero coefficients in the row positions or a row position of each of the non-zero coefficients in the column positions indicated by the second bitmap indicated by the second bitmap.

Optionally, the zero coefficient indication information further includes a fourth bitmap, and one bit in the fourth bitmap corresponds to at least one of a column position in a row indicated by the index of one zero coefficient and a row position in a column indicated by the index of one zero coefficient.

Optionally, coefficients at crossing positions of column coefficients and row coefficients in the coefficient matrix are the zero coefficients, and the zero coefficient indication information is used to indicate the row coefficients and the column coefficients where the zero coefficients are located.

Optionally, it is predefined that the precoding matrix uses part of row coefficients in a plurality of row coefficients in the coefficient matrix, and the zero coefficient indication information is used to indicate zero coefficients of the part of row coefficients in the coefficient matrix.

Optionally, the channel state information further carries at least one wideband amplitude coefficient. One wideband amplitude coefficient corresponds to one compressed base vector in a codebook.

Optionally, the channel state information further carries at least one differential amplitude coefficient. One differential amplitude coefficient corresponds to a differential coefficient of one wideband amplitude coefficient.

Solid devices of the determining unit 301 and the sending unit 302 in the terminal device may correspond to the processor 202 or the transceiver 203 in FIG. 7, and the terminal device may be used to execute the method provided by the embodiment shown in FIG. 1, so that functions and the like that can be implemented by all functional modules of the device may refer to description of the embodiment shown in FIG. 1, which is omitted here.

Figure 9:
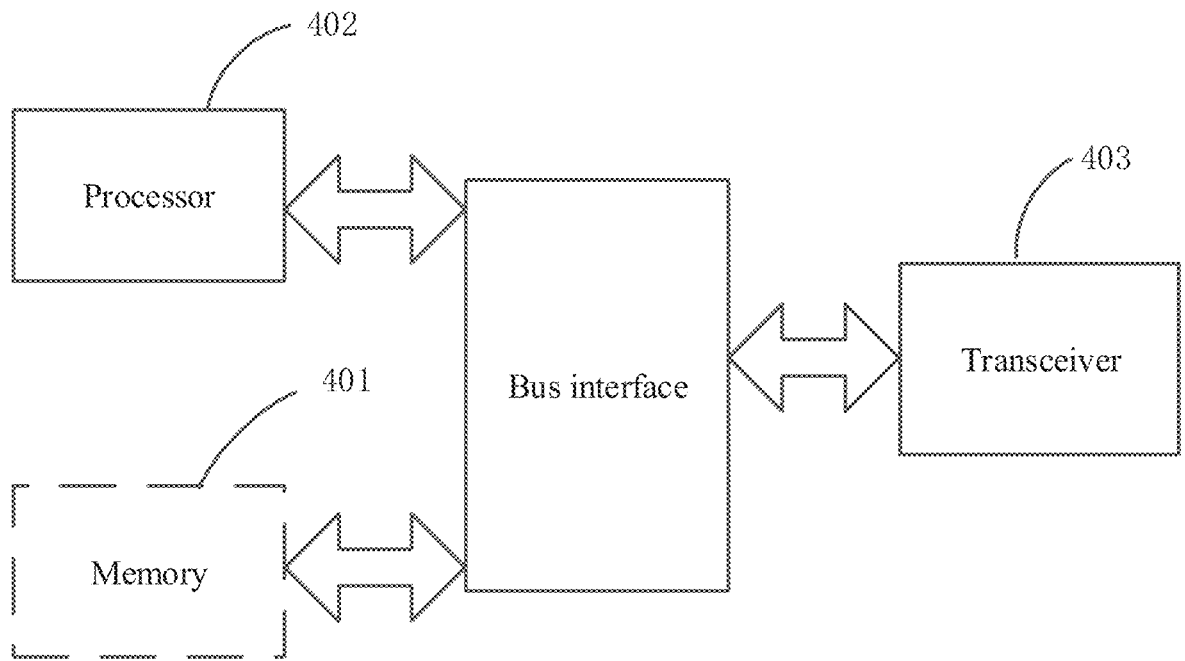
FIG. 9 is a schematic structural diagram of a network device provided by an embodiment of the present application.

Referring to FIG. 9, based on the same inventive concept, an embodiment of the present application further provides a network device. The network device includes a memory 401, a processor 402 and a transceiver 403. The memory 401 and the transceiver 403 may be connected with the processor 402 through a bus interface (FIG. 9 takes this as an example), or may also be connected with the processor 402 through a special connecting line. The transceiver 403 sends information under a control of the processor 402.

The memory 401 may be configured to store programs. The processor 402 may be used to read the programs in the memory 401 to execute the following process.

Channel state information from a terminal device is received, wherein the channel state information includes base vector indication information, the base vector indication information is used for indicating a compressed base vector in a precoding matrix, the compressed base vector belongs to a set of candidate base vectors, and the compressed base vector weighted by coefficients of the precoding matrix is used to construct a frequency domain characteristic of the precoding matrix.

The channel state information is parsed according to the compressed base vector.

Optionally, the processor 402 is further configured to: send configuration information to the terminal device. The configuration information is used to indicate at least one of: a quantity of compressed base vectors, a quantity of subbands corresponding to the channel state information, or a quantity of beams respectively corresponding to each transmission layer mapped by the precoding matrix.

Optionally, the channel state information further carries zero coefficient indication information or non-zero coefficient indication information. The zero coefficient indication information is used to indicate zero coefficients used by each of at least two transmission layers mapped by the precoding matrix, and the zero coefficients are coefficients used as 0 in a plurality of coefficients of the precoding matrix. The non-zero coefficient indication information is used to indicate non-zero coefficients used by each of the at least two transmission layers, and the non-zero coefficients are coefficients used as non-zero values in the plurality of coefficients of the precoding matrix.

Optionally, the channel state information further carries at least one wideband amplitude coefficient. One wideband amplitude coefficient corresponds to one compressed base vector in a codebook.

Optionally, the channel state information further carries at least one differential amplitude coefficient. One differential amplitude coefficient corresponds to a differential coefficient of one wideband amplitude coefficient.

In FIG. 9, a bus architecture may include interconnected buses of any quantity and bridges of any quantity, which are specifically linked together through various circuits of one or more processors represented by the processor 402 and various circuits of memories represented by the memory 401. The bus architecture may also link various other circuits such as peripheral devices, voltage regulators, and power management circuits, which are well known in the art, and therefore are not further described herein. A bus interface provides an interface. The transceiver 403 may be a plurality of elements, namely including a sender and a transceiver, and provides units for communication with various other apparatuses on a transmission medium. The processor 402 is responsible for managing the bus architecture and general processing, and the memory 401 may store data used when the processor 402 executes operations.

Figure 10:
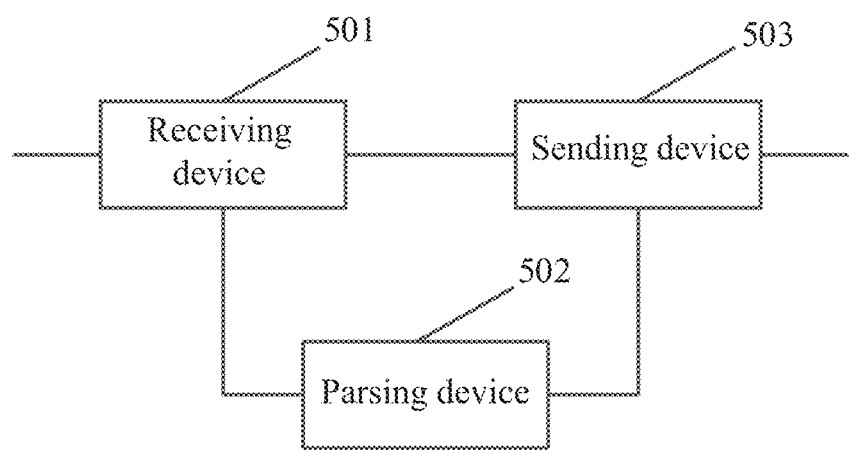
FIG. 10 is another schematic structural diagram of a network device provided by an embodiment of the present application.

Referring to FIG. 10, based on the same inventive concept, an embodiment of the present application provides a network device. The network device includes a receiving unit 501 and a parsing unit 502. The receiving unit is used to receive channel state information from a terminal device, wherein the channel state information carries base vector indication information, the base vector indication information is used for indicating a compressed base vector in a precoding matrix, the compressed base vector belongs to a set of candidate base vectors, and the compressed base vector weighted by coefficients of the precoding matrix is used to construct a frequency domain characteristic of the precoding matrix. The parsing unit is used to parse the channel state information according to the compressed base vector.

Optionally, a sending unit 503 is further included and used to: send configuration information to the terminal device. The configuration information is used to indicate at least one of: a quantity of compressed base vectors, a quantity of sub-bands corresponding to the channel state information, or a quantity of beams respectively corresponding to each transmission layer mapped by the precoding matrix.

Optionally, the channel state information further carries zero coefficient indication information or non-zero coefficient indication information. The zero coefficient indication information is used to indicate zero coefficients used by each of at least two transmission layers mapped by the precoding matrix, and the zero coefficients are coefficients used as 0 in a plurality of coefficients of the precoding matrix. The non-zero coefficient indication information is used to indicate non-zero coefficients used by each of the at least two transmission layers, and the non-zero coefficients are coefficients used as non-zero values in the plurality of coefficients of the precoding matrix.

Optionally, the channel state information further carries at least one wideband amplitude coefficient. One wideband amplitude coefficient corresponds to one compressed base vector in a codebook.

Optionally, the channel state information further carries at least one differential amplitude coefficient. One differential amplitude coefficient corresponds to a differential coefficient of one wideband amplitude coefficient.

Solid devices corresponding to the receiving unit, the parsing unit and the sending unit in the network device may be the processor 402 or the transceiver 403 in FIG. 9, and the network device may be used to execute the method provided by the embodiment shown in FIG. 1, so that functions and the like that can be implemented by all functional modules of the device may refer to description of the embodiment shown in FIG. 1, which is omitted here.

Based on the same inventive concept, an embodiment of the present application provides a computer readable storage medium storing a computer instruction, and when the computer is run on a computer, the computer instruction causes the computer execute the method as shown in FIG. 1.

In a specific implementation process, the computer readable storage medium includes: a Universal Serial Bus flash drive (USB), a mobile hard disk, a Read-Only Memory (ROM), a Random Access Memory (RAM), a magnetic disk or an optical disk, and various storage media that can store program codes.

The methods for sending or receiving the channel state information provided by the embodiments of the present application may be applied to a wireless communication system, such as 5G system. However, applicable communication systems include, but are not limited to, the 5G system or its evolutional systems, other systems based on orthogonal frequency division multiplexing (OFDM), systems based on DFT-Spread OFDM (DFT-S-OFDM) and Evolved Long Term Evolution (eLTE), new network device systems, etc. In practical applications, the above devices may be connected wirelessly or in a wired manner.

It needs to be noted that the above communication systems may include a plurality of terminal devices, and a network device may communicate with (transmitting signaling or data) the plurality of terminal devices. The terminal devices involved in the embodiments of the present application may refer to devices providing voice and/or data connectivity for a user, hand-held devices with a wireless connection function, or other processing devices connected to a wireless modem. Wireless user devices may communicate with one or more core networks through a Radio Access Network (RAN), and the terminal devices may be mobile terminal, e.g., a mobile phone (or called a "cell" phone) and a computer with the mobile terminals, for example, a portable or pocket or hand-held or computer built-in or vehicle-mounted mobile apparatuses, which exchange languages and/or data with the radio access network. For example, a Personal Communication Service (PCS) telephone, a cordless telephone, a session initiated protocol (SIP) phone, a Wireless Local Loop (WLL) station, a personal digital assistant (PDA), and other devices. The terminals may be also called a system, a Subscriber Unit, a Subscriber Station, a Mobile Station, a Mobile, a Remote Station, an Access Point, a Remote Terminal, an Access Terminal, a User Terminal, a User Agent, a User Device and a wireless device.

The network device provided by the embodiments of the present application may be a base station, or is used for interconverting a received air frame and IP group, serving as a router between the wireless terminal device and the rest part of an access network, wherein the rest part of the access network may include an internet protocol (IP) network device. The network device may also be a device to coordinate attribute management of air interfaces. For example, the network device may be a network device in a 5G system, such as a Next generation Node B (gNB), may also be a Base Transceiver Station (BTS) in a Global System for Mobile Communication (GSM) or Code Division Multiple Access (CDMA), may also be a NodeB in Wideband Code Division Multiple Access (WCDMA), and may also be an evolutional Node B (eNB or e-NodeB) in LTE, which is not defined in the embodiments of the present application.

In the embodiments of the present application, it should be understood that the disclosed devices and methods may be implemented in other manners. For example, the device embodiments described above are only schematic. For example, the division of the units is only a logical function partition, and there may be other partition methods during actual implementation, for example, multiple units or components can be combined or integrated into another system, or some features can be ignored or not executed. On the other hand, the coupling or direct coupling or communication connection between the displayed or discussed can be indirect coupling or communication connection through some interfaces, devices or units, and may be electrical or other forms.

Each functional unit in the embodiments of the present application may be integrated into a processing unit, or each unit may also be an independent physical module.

When the integrated units are implemented in the form of software function units and are sold or used as an independent product, the integrated units may be stored in a computer readable storage medium. Based on this understanding, the technical solutions of the embodiments of the present application may be completely or partially embodied in the form of a software product. The computer software product is stored in a storage medium, including a plurality of instructions for making a computer device (such as a personal computer, a server, or a network device, etc.) or a processor execute all or part of the steps of the methods of the various embodiments of the present application. The aforementioned storage medium includes: a universal serial bus flash drive, a mobile hard disk, a ROM, a RAM, a magnetic disk, or an optical disk and various media capable of storing program codes.

As described above, the above embodiments are only used to introduce the technical solutions of the present application in detail, but description of the above embodiments is only used to help understanding the methods of the embodiments of the present application and shall not be understood as limiting the embodiments of the present application. Variations or replacements that come to the mind of those skilled in the art easily should all be covered in the scope of protection of the embodiments of the present application.

What is claimed is:

1. A method for sending channel state information, performed by a terminal device and comprising:
   determining a compressed base vector in a precoding matrix, wherein the compressed base vector belongs to a set of candidate base vectors, and the compressed base vector weighted by coefficients of the precoding matrix is used to construct a frequency domain characteristic of the precoding matrix; and
   sending channel state information to a network device, wherein the channel state information comprises base vector indication information, and the base vector indication information is used to indicate the compressed base vector;
   wherein: if at least one beam corresponding to each of at least two transmission layers mapped by the precoding matrix uses a same set of the base vectors and different transmission layers in the at least two transmission layers use different compressed base vectors, the base vector indication information is located in a second part of the channel state information.

2. The method according to claim 1, wherein the determining the compressed base vector in the precoding matrix comprises:
   determining the compressed base vector in the precoding matrix according to configuration information from the network device or which is predefined; wherein the configuration information is used to indicate a quantity of the compressed base vectors.

3. The method according to claim 2, wherein the base vector indication information comprises an index combination of each base vector comprised in the compressed base vector in the set of the candidate base vectors.

4. The method according to claim 1, wherein if at least one beam corresponding to each of the at least two transmission layers mapped by the precoding matrix uses the same set of the base vectors and different transmission layers in the at least two transmission layers use the different compressed base vectors, the base vector indication information comprises first sub indication information and second sub indication information, wherein:
   the first sub indication information is used to indicate a set of base vectors used for the at least two transmission layers, and the second sub indication information is used to indicate a set of base vectors used for each of the at least two transmission layers.

5. A method for receiving channel state information, performed by a network device, comprising:
   receiving channel state information from a terminal device, wherein the channel state information comprises base vector indication information, the base vector indication information is used for indicating a compressed base vector in a precoding matrix, the compressed base vector belongs to a set of candidate base vectors, and the compressed base vector weighted by coefficients of the precoding matrix is used to construct a frequency domain characteristic of the precoding matrix; and
   parsing the channel state information according to the compressed base vector;
   wherein if at least one beam corresponding to each of at least two transmission layers mapped by the precoding matrix uses a same set of the base vectors and different transmission layers in the at least two transmission layers use different compressed base vectors, the base vector indication information is located in a second part of the channel state information.

6. The method according to claim 5, before receiving the channel state information from the terminal device, further comprising:
   sending configuration information to the terminal device, wherein the configuration information is used to indicate a quantity of the compressed base vectors.

7. A terminal device, comprising:
   a memory, configured to store an instruction;
   a transceiver, used to send information under a control of the processor; and
   a processor, configured to read the instruction in the memory to:
   determine a compressed base vector in a precoding matrix, wherein the compressed base vector belongs to a set of candidate base vectors; and the compressed base vector weighted by coefficients of the precoding matrix is used to construct a frequency domain characteristic of the precoding matrix; and
   send channel state information to a network device, wherein the channel state information comprises base vector indication information, and the base vector indication information is used to indicate the compressed base vector;
   wherein: if at least one beam corresponding to each of at least two transmission layers mapped by the precoding matrix uses a same set of the base vectors and different transmission layers in the at least two transmission layers use different compressed base vectors, the base vector indication information is located in a second part of the channel state information.

8. The terminal device according to claim 7, wherein the processor is further configured to:
   determine the compressed base vector in the precoding matrix according to configuration information from the network device or which is predefined; wherein the configuration information is used to indicate a quantity of the compressed base vectors.

9. The terminal device according to claim 8, wherein the base vector indication information comprises an index combination of each base vector comprised in the compressed base vector in the set of the candidate base vectors.

10. The terminal device according to claim 7, wherein if the at least one beam corresponding to each of the at least two transmission layers mapped by the precoding matrix uses the same set of the base vectors and the different transmission layers in the at least two transmission layers use the different compressed base vectors, the base vector indication information comprises first sub indication information and second sub indication information, wherein:
    the first sub indication information is used to indicate a set of base vectors used for the at least two transmission layers, and the second sub indication information is used to indicate a set of base vectors used for each of the at least two transmission layers.

11. A network device, comprising:
a memory, configured to store an instruction;
a transceiver, used to send information under a control of the processor; and
a processor, configured to read the instruction in the memory to perform the method according to claim 5.

12. The network device according to claim 11, wherein the processor is further configured to:
send configuration information to the terminal device, wherein the configuration information is used to indicate a quantity of the compressed base vectors.

13. The method according to claim 5, wherein the base vector indication information comprises an index combination of each base vector comprised in the compressed base vector in the set of the candidate base vectors.

14. The method according to claim 5, wherein if the at least one beam corresponding to each of the at least two transmission layers mapped by the precoding matrix uses the same set of the base vectors and the different transmission layers in the at least two transmission layers use the different compressed base vectors, the base vector indication information comprises first sub indication information and second sub indication information, wherein:
the first sub indication information is used to indicate a set of base vectors used for the at least two transmission layers, and the second sub indication information is used to indicate a set of base vectors used for each of the at least two transmission layers.

* * * * *